(12) United States Patent
Bhaumik

(10) Patent No.: US 11,739,647 B2
(45) Date of Patent: Aug. 29, 2023

(54) TURBINE BLADE

(71) Applicant: ROLLS-ROYCE plc, London (GB)

(72) Inventor: Soumyik Bhaumik, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 18/073,143

(22) Filed: Dec. 1, 2022

(65) Prior Publication Data

US 2023/0203954 A1 Jun. 29, 2023

(30) Foreign Application Priority Data

Dec. 27, 2021 (IN) .............................. 202111060893

(51) Int. Cl.
  *F01D 5/22* (2006.01)
  *F01D 5/18* (2006.01)

(52) U.S. Cl.
  CPC ............ *F01D 5/181* (2013.01); *F01D 5/225* (2013.01); *F05D 2220/32* (2013.01); *F05D 2240/30* (2013.01); *F05D 2260/20* (2013.01)

(58) Field of Classification Search
  CPC .......... F01D 5/143; F01D 5/225; F01D 25/08; F05D 2240/30; F05D 2240/307; F05D 2240/80
  See application file for complete search history.

(56) References Cited

U.S. PATENT DOCUMENTS 3,182,955 A 5/1965 Hyde
3,923,420 A * 12/1975 Chifos .................. F01D 5/3038
                                                416/212 R
6,340,285 B1 * 1/2002 Gonyou ................. F01D 25/246
                                                415/176
6,811,378 B2 * 11/2004 Kraft ....................... F01D 5/225
                                                416/191
8,430,626 B1 * 4/2013 Liang ....................... F01D 5/22
                                                277/412

(Continued)

FOREIGN PATENT DOCUMENTS

EP        3748127 A1 * 12/2020 ............. F01D 11/006

OTHER PUBLICATIONS

Jun. 30, 2022 Search and Examination Report issued in British Patent Application No. GB2201632.3.

(Continued)

*Primary Examiner* — Courtney D Heinle
*Assistant Examiner* — Danielle M. Christensen
(74) *Attorney, Agent, or Firm* — Oliff PLC

(57) ABSTRACT

A turbine blade including an aerofoil and a shroud. The shroud includes a first abutment surface configured to face a second abutment surface of a first circumferentially adjacent turbine blade. The shroud further includes a second abutment surface configured to face a first abutment surface of a second circumferentially adjacent turbine blade. The shroud further includes an inner platform surface extending at least circumferentially between the first abutment surface and the second abutment surface. The shroud further includes a first recessed surface extending at least radially and circumferentially from the first abutment surface to the inner platform surface. The first recessed surface defines a first recessed region configured to receive a flow of a cooling fluid from the first circumferentially adjacent turbine blade.

18 Claims, 33 Drawing Sheets

(56) References Cited

U.S. PATENT DOCUMENTS

| | | | |
|---|---|---|---|
| 8,573,925 B2* | 11/2013 | Townes | F01D 5/225 |
| | | | 415/115 |
| 9,759,070 B2* | 9/2017 | Zhang | F01D 5/187 |
| 10,337,404 B2* | 7/2019 | McMahan | F01D 9/023 |
| 10,947,898 B2* | 3/2021 | Zemitis | F02C 3/04 |
| 2010/0316486 A1 | 12/2010 | Townes | |
| 2015/0064010 A1* | 3/2015 | Zhang | F01D 5/186 |
| | | | 416/189 |
| 2015/0354369 A1* | 12/2015 | Chius | F01D 5/187 |
| | | | 416/96 R |
| 2016/0258294 A1 | 9/2016 | Weinert et al. | |

OTHER PUBLICATIONS

May 30, 2023 Search Report issued in European Patent Application No. 22210167.7.

* cited by examiner

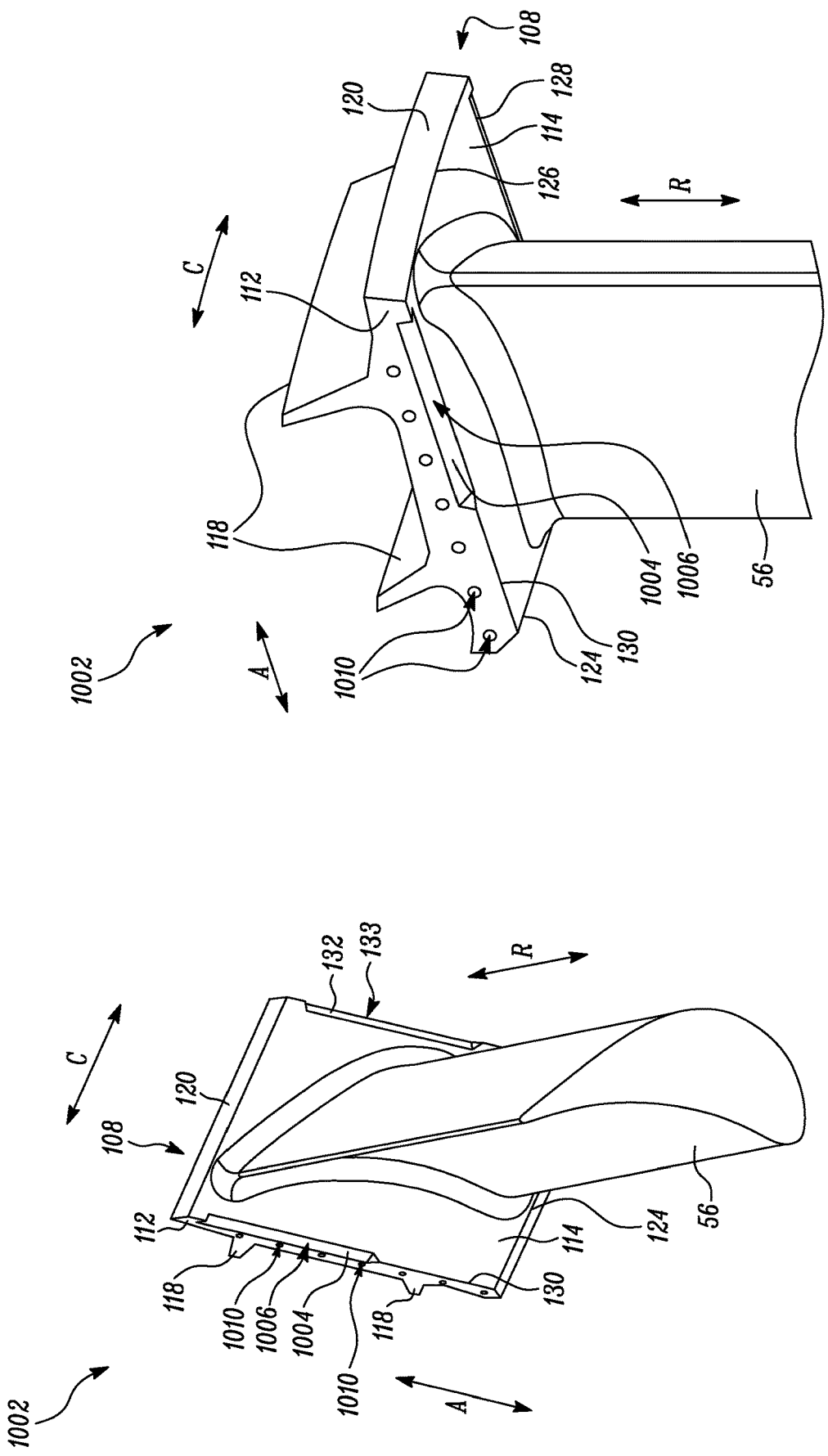

TURBINE BLADE

CROSS-REFERENCE TO RELATED APPLICATIONS

This specification is based upon and claims the benefit of priority from India patent application number IN 202111060893 filed on 27 Dec. 2021, the entire contents of which is incorporated herein by reference.

BACKGROUND

Field of the Disclosure

The present disclosure generally relates to a turbine blade, and in particular to a turbine blade for a gas turbine engine.

Description of the Related Prior Art

A turbine for a turbomachine, such as a gas turbine engine, includes a row of turbine blades arranged around a common axis. Generally, the turbine blade includes an aerofoil and a shroud attached to the aerofoil. Gas turbine engines typically operate at very high temperature environment, often surrounded by hot gas with temperatures even higher than the metal melting points. The shroud provides a protective barrier to protect components outside the blade row from the high temperatures of hot working gases and optimise the power output of the turbine. Therefore, it is important to maintain a desirable temperature of the shroud to prevent excessive deterioration of the material of the shroud as well as other metal components. In other words, it is important to provide adequate cooling to the turbine blade to avoid excessive wear of the blade material.

Currently, the turbine blade is cooled through internal passages within the aerofoil and the shroud. Cooling air flows through the internal passages before exiting through rows of cooling passageway openings formed on the shroud. Additionally, for cooling the turbine blade, a cooling film layer comprising cold air is also introduced near a surface of the turbine blade such that the cold air film forms a protective curtain barrier between the hot gas and the turbine blade (i.e., a metal component).

When the turbine blades are assembled in the turbine, the shrouds of adjacent blades together form an annular shroud. The turbine blades are assembled in such a way that the corresponding shrouds of the circumferentially adjacent turbine blades abut against each other. The adjacent shrouds abut against each other along a "wedge surface" which also defines the cooling passageway openings of the internal passages.

In some cases, while assembling the turbine blades, circumferential gaps or segment gaps may be formed between the adjacent shrouds due to manufacturing tolerances. The formation of an unintended circumferential gap between two adjacent shrouds may cause a leakage of the cooling film layer into the circumferential gap. This may cause a reduced or an ineffective cooling near the surface of the turbine blades. As the cooling film layer leaks into the circumferential gap, a metal surface of the turbine blade may be impinged with hot gases, thereby causing metal oxidation. The metal oxidation may deteriorate the life of the turbine blades. Further, cold air exiting from the cooling passageway openings may also leak or ingest into the circumferential gap. This may further reduce an amount of cooling provided to the turbine blade by the cold air flowing through the internal passages.

Therefore, conventional methods for cooling the turbine blades may be ineffective and inefficient. This insufficient cooling of the turbine blades may result in an excessive wear of the turbine blades. Moreover, direct impingement of the hot gases on the turbine blades may increase thermal stress and geometric deformations in the turbine blades. Hence, over-heating of the turbine blades due to reduced cooling may decrease a service life of the turbine blades. Thus, there exists a need to develop an improved cooling arrangement for a turbine blade which overcomes the above-mentioned problems.

SUMMARY OF THE DISCLOSURE

According to a first aspect there is provided a turbine blade of a turbine of a gas turbine engine as set out in the appended claims. The turbine blade includes an aerofoil and a shroud attached to the aerofoil. The shroud includes a first abutment surface configured to face a second abutment surface of a first circumferentially adjacent turbine blade. The shroud further includes a second abutment surface circumferentially spaced apart from and opposite to the first abutment surface. The second abutment surface is configured to face a first abutment surface of a second circumferentially adjacent turbine blade. The shroud further includes an inner platform surface extending at least circumferentially between the first abutment surface and the second abutment surface. The inner platform surface is disposed adjacent to the aerofoil. The shroud further includes an outer platform surface radially spaced apart from the inner platform surface and extending at least circumferentially between the first abutment surface and the second abutment surface. The shroud further includes a first recessed surface extending at least radially and circumferentially from the first abutment surface to the inner platform surface. The first recessed surface is radially spaced apart from the outer platform surface and extends at least axially along at least a portion of the first abutment surface. The first recessed surface defines a first recessed region configured to receive a flow of a cooling fluid from the first circumferentially adjacent turbine blade.

When the turbine blade is assembled with the first circumferentially adjacent turbine blade, the first recessed surface extending from the first abutment surface forms a shallow trench adjacent to a circumferential gap between the first abutment surface of the turbine blade and the second abutment surface of the first circumferentially adjacent turbine blade. The flow of the cooling fluid (e.g., cooling air) from the first circumferentially adjacent turbine blade may form a cooling film layer that flows from the first circumferentially adjacent turbine blade to the turbine blade. The shallow trench formed by the first recessed surface may be immediately downstream of the circumferential gap relative to the flow of the cooling fluid from the first circumferentially adjacent turbine blade to the turbine blade. The first recessed surface may further have a downstream side relative to the flow of the cooling fluid and spaced apart from the circumferential gap. The shallow trench formed by the first recessed surface may cause the cooling fluid to flow to the downstream side of the first recessed surface, and thereby resume forming the cooling film layer that could have otherwise escaped or leaked through the circumferential gap in the conventional turbine blades.

The formation of the first recessed surface may cause a minimal bending of the cooling film layer towards the circumferential gap. In this way, as compared to the conventional designs of the turbine blades, a relatively greater portion of the cooling film layer flows from the first circumferentially adjacent turbine blade to the turbine blade without leaking into the circumferential gap. Thus, the cooling film layer may provide an improved cooling to the turbine blade. The inclusion of the first recessed surface may allow the cooling fluid to flow close to areas of the shroud that may otherwise be susceptible to hotspots, and in particular close to the inner platform surface for conductive cooling through the thickness of the shroud.

As majority of the cooling fluid in the cooling film layer passes from the first circumferentially adjacent turbine blade to the turbine blade without leaking into the circumferential gap, there are low chances of impingement of the hot gases on the metal surfaces of the turbine blade. This may prevent over-heating of the turbine blade due to improved cooling and may therefore extend the useful lifetime of the turbine blade for improved reliability. In contrast to the conventional turbine blades, a relatively less impingement of the hot gases on the turbine blade may prevent oxidation of metal surfaces. This may further reduce an overall deterioration of the turbine blade material and improve performance of the turbine blade.

The cooling provided by the cooing film layer may also prevent excessive wear of the turbine blade during operation of the turbine. Further, due to improved cooling of the turbine blade, the thermal stress and the geometrical deformations, to which the turbine blade is usually subjected to, may be kept low. The reduced thermal stress on the turbine blade may further increase an overall efficiency of the turbine.

The shroud further includes at least one first internal cooling passage and at least one first passage opening disposed on the first abutment surface. The at least one first internal cooling passage extends from the at least one first passage opening, such that the at least one first internal cooling passage is configured to discharge a flow of a cooling fluid through the at least one first passage opening. The first recessed surface is spaced apart and fluidly separate from the at least one first passage opening. Therefore, the first recessed surface may not interfere with the flow of the cooling fluid discharged from the at least one first passage opening.

The first recessed surface is at least radially spaced apart from the at least one first passage opening. This may significantly reduce or prevent any interference between the cooling fluid discharged from the at least one first passage opening and the first recessed surface.

In some embodiments, a maximum radial length of the first recessed surface is from 5% to 90% of a minimum radial distance between the at least one first passage opening and the inner platform surface. The maximum radial length of the first recessed surface may be based on application requirements.

In some embodiments, a minimum radial distance between the first recessed surface and the at least one first passage opening is from 10% to 95% of the minimum radial distance between the at least one first passage opening and the inner platform surface. The minimum radial distance may significantly reduce or prevent any interference between the cooling fluid discharged from the at least one first passage opening and the first recessed surface.

In some embodiments, a ratio of the maximum radial length of the first recessed surface to a maximum circumferential length of the first recessed surface is from 0.15:1 to 3:1. The ratio of the maximum radial length of the first recessed surface to the maximum circumferential length of the first recessed surface may be based on application requirements.

In some embodiments, the first recessed surface has a planar shape. The planar shape may reduce manufacturing complexity.

In some embodiments, the first recessed surface is inclined at an inclination angle with respect to the first abutment surface. The inclination angle is from 20 degrees to 80 degrees. The inclination angle of the first recessed surface may be based on application requirements.

In some embodiments, the first recessed surface has a convex shape. The convex shape may significantly reduce or prevent the leakage of the cooling fluid through the circumferential gap.

In some embodiments, the first recessed surface has a first planar portion extending from the first abutment surface and a second planar portion extending from the first planar portion to the inner platform surface. The first planar portion is inclined to the second planar portion. The inclination between the first planar portion and the second planar portion may significantly reduce or prevent any leakage of the cooling fluid through the circumferential gap.

In some embodiments, the first planar portion is perpendicular to the second planar portion. This may result in an L-shape of the first recessed surface. The L-shaped first recessed surface may significantly reduce or prevent any leakage of the cooling fluid through the circumferential gap.

In some embodiments, the shroud further includes a trailing surface extending at least circumferentially between the first abutment surface and the second abutment surface. The trailing surface further extends at least radially between the inner platform surface and the outer platform surface. The shroud further includes a leading surface axially spaced apart from the trailing surface and extending at least circumferentially between the first abutment surface and the second abutment surface. The leading surface further extends at least radially between the inner platform surface and the outer platform surface.

In some embodiments, the first recessed surface is at least axially spaced apart from each of the trailing surface and the leading surface. Such an arrangement of the first recessed surface relative to the trailing surface and the leading surface may be based on application requirements.

In some embodiments, the first recessed surface extends at least axially along the portion of the first abutment surface from the trailing surface towards the leading surface, such that the first recessed surface is at least axially spaced apart from the leading surface. Such an arrangement of the first recessed surface relative to the trailing surface and the leading surface may be based on application requirements.

In some embodiments, the shroud further includes a first abutment edge formed at an intersection between the first abutment surface and the inner platform surface. The first recessed surface intersects the first abutment edge. The intersection between the first recessed surface and the first abutment edge may significantly reduce or prevent any leakage of the cooling fluid through the circumferential gap.

In some embodiments, the first recessed surface extends at least axially along the first abutment surface from the trailing surface to the leading surface. Such an arrangement of the first recessed surface relative to the first abutment surface, the trailing surface, and the leading surface may be based on application requirements.

In some embodiments, the shroud further includes a shroud leading edge formed at an intersection between the leading surface and the inner platform surface. The first recessed surface intersects the shroud leading edge. The intersection between the first recessed surface and the shroud leading edge may significantly reduce or prevent any leakage of the cooling fluid through the circumferential gap.

In some embodiments, the shroud further includes a shroud trailing edge formed at an intersection between the trailing surface and the inner platform surface. The first recessed surface intersects the shroud trailing edge. The intersection between the first recessed surface and the shroud trailing edge may significantly reduce or prevent any leakage of the cooling fluid through the circumferential gap.

In some embodiments, the first recessed surface includes a plurality of recessed surface portions axially spaced apart from each other and defining a plurality of corresponding recessed regions. The shroud further includes a plurality of walls axially spaced apart from each other and extending from the first abutment surface to the inner platform surface. Each recessed surface portion is formed between corresponding adjacent walls from the plurality of walls. Such a discontinuous configuration of the first recessed surface may significantly reduce or prevent any leakage of the cooling fluid through the circumferential gap.

In some embodiments, the shroud further includes a second recessed surface extending at least radially and circumferentially from the second abutment surface to the inner platform surface. The second recessed surface is radially spaced apart from the outer platform surface and extends at least axially along at least a portion of the second abutment surface. The second recessed surface defines a second recessed region configured to receive a flow of a cooling fluid. The second recessed surface may significantly reduce or prevent any leakage of the cooling fluid through a circumferential gap between the turbine blade and the second circumferentially adjacent turbine blade.

In some embodiments, the shroud further includes at least one second internal cooling passage and at least one second passage opening disposed on the second abutment surface. The at least one second internal cooling passage extends from the at least one second passage opening, such that the at least one second internal cooling passage is configured to discharge a flow of a cooling fluid through the at least one second passage opening. The second recessed surface is spaced apart and fluidly separate from the at least one second passage opening. Therefore, the second recessed surface may not interfere with the flow of the cooling fluid discharged from the at least one second passage opening.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which:

FIGS. 10A and 10B are partial perspective views of a turbine blade of the turbine of FIG. 2, according to an embodiment of the present disclosure;

DETAILED DESCRIPTION OF THE DISCLOSURE

Figure 1:
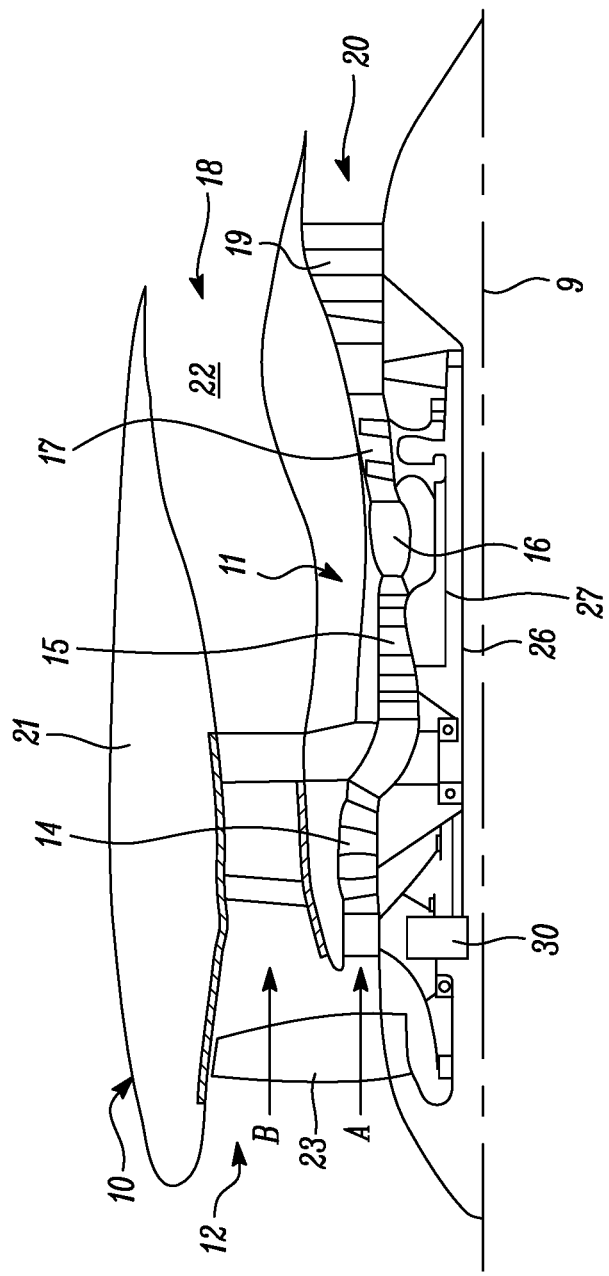
FIG. 1 is a sectional side view of a gas turbine engine, according to an embodiment of the present disclosure.

FIG. 1 illustrates a gas turbine engine 10 having a principal rotational axis 9. The gas turbine engine 10 comprises an air intake 12 and a propulsive fan 23 that generates two airflows: a core airflow A and a bypass airflow B. The gas turbine engine 10 comprises an engine core 11 that receives the core airflow A. The engine core 11 comprises, in axial flow series, a low pressure compressor 14, a high pressure compressor 15, a combustor 16, a high pressure turbine 17, a low pressure turbine 19, and a core exhaust nozzle 20. A nacelle 21 surrounds the gas turbine engine 10 and defines a bypass duct 22 and a bypass exhaust nozzle 18. The bypass airflow B flows through the bypass duct 22. The propulsive fan 23 is attached to and driven by the low pressure turbine 19 via an input shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustor 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The propulsive fan 23 generally provides the majority of the propulsive thrust. The epicyclic gearbox 30 is a reduction gearbox.

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the engine core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30. In some other arrangements, the gas turbine engine 10 may comprise a direct drive.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

As used herein, the terms "leading" and "trailing", unless otherwise mentioned, are with reference to the direction of the airflow (e.g., the core airflow A) through the gas turbine engine 10.

In addition, the present disclosure is equally applicable to aero gas turbine engines, marine gas turbine engines and land-based gas turbine engines.

Figure 2:
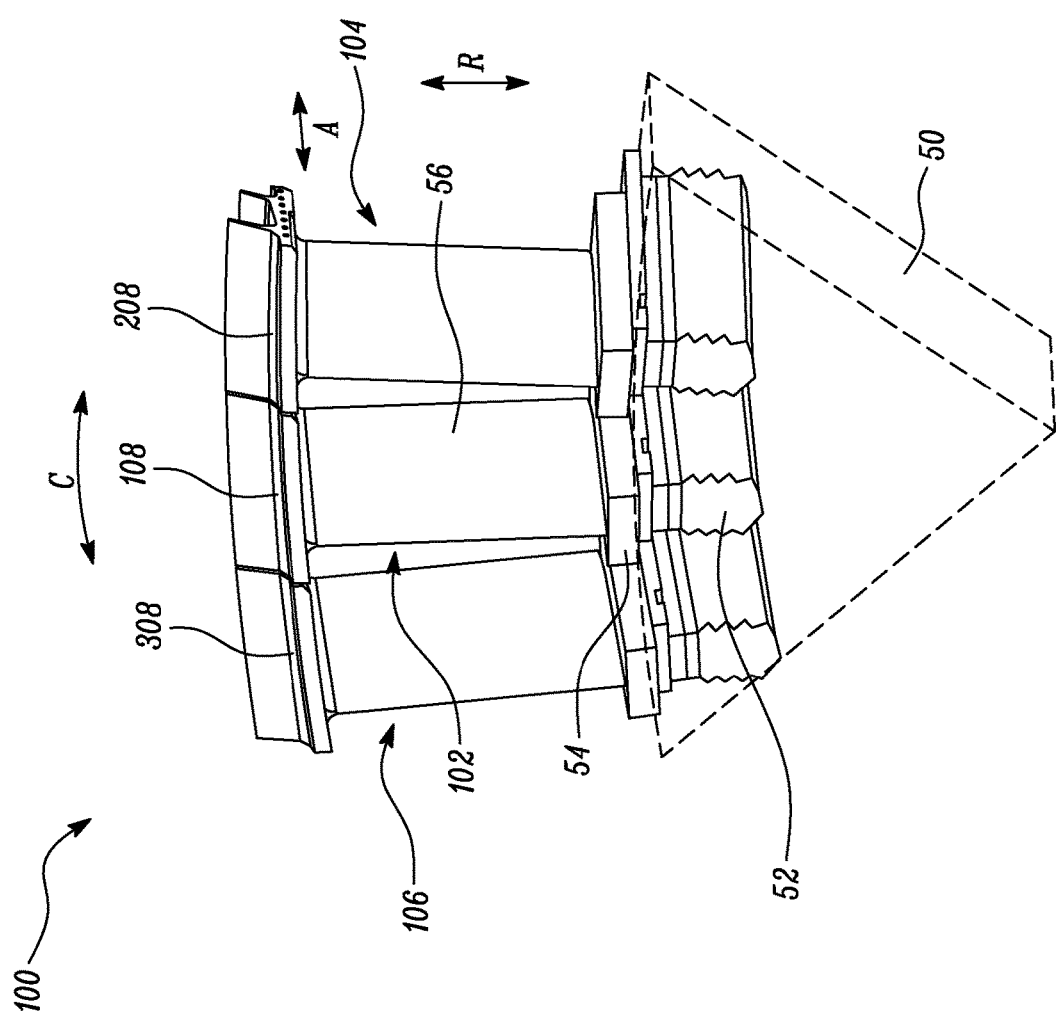
FIG. 2 is a partial perspective view of a turbine of the gas turbine engine of FIG. 1, according to an embodiment of the present disclosure.

FIG. 2 illustrates a partial perspective view of a turbine 100 of the gas turbine engine 10 (shown in FIG. 1), according to an embodiment of the present disclosure. In some embodiments, the turbine 100 may be the low pressure turbine 19 illustrated in FIG. 1. In some embodiments, the turbine 100 may be the high pressure turbine 17 illustrated in FIG. 1. Some components of the turbine 100 are not shown in FIG. 2 for illustrative purposes.

The turbine 100 includes a plurality of turbine blades. For illustrative purposes, only three turbine blades (i.e., a turbine blade 102, a first circumferentially adjacent turbine blade 104, and a second circumferentially adjacent turbine blade 106) from the plurality of turbine blades are shown. The plurality of turbine blades is circumferentially arranged adjacent to each other about a rotational axis of the turbine 100. The rotational axis of the turbine 100 is same as the principal rotational axis 9 of the gas turbine engine 10. Therefore, the turbine blade 102, the first circumferentially adjacent turbine blade 104, and the second circumferentially adjacent turbine blade 106 are circumferentially arranged adjacent to each other about the rotational axis (i.e., the principal rotational axis 9) of the turbine 100.

An axial direction A, a circumferential direction C and a radial direction R are illustrated by arrows. The axial direction A is parallel to the principal rotational axis 9. Both the circumferential direction C and the radial direction R are defined with respect to the principal rotational axis 9. The turbine blade 102, the first circumferentially adjacent turbine blade 104, and the second circumferentially adjacent turbine blade 106 are circumferentially arranged along the circumferential direction C. The terms "radially inward", "radially outward", "extending radially", and "radially spaced apart", as used herein, may be with respect to the radial direction R. Further, the terms "circumferentially extending" and "circumferentially spaced apart", as used herein, may be with respect to the circumferential direction C. Moreover, the terms "axially extending" and "axially spaced apart", as used herein, may be with respect to the axial direction A.

The turbine blade 102, the first circumferentially adjacent turbine blade 104, and the second circumferentially adjacent turbine blade 106 are mounted on a disk 50 for rotation at operating speeds. Each turbine blade includes a root section attached to the disk 50. The turbine blade 102 includes a root section 52 having a fir-tree fixing for attaching the turbine blade 102 to the disk 50 of the turbine 100. Further, each turbine blade includes a platform section and an aerofoil section. The turbine blade 102 includes a platform section 54 and an aerofoil 56 attached to the platform section 54.

The turbine blade 102 further includes a shroud 108 attached to the aerofoil 56. The aerofoil 56 at least extends from the platform section 54 to the shroud 108 along the radial direction R. Since the turbine blade 102 is configured to be installed in the disk 50 for rotation about the principal rotational axis 9 of the gas turbine engine 10, the turbine blade 102 has an axial extent corresponding to the principal rotational axis 9, a radial extent which is generally spanwise from the root section 52 to the shroud 108, and a circumferential extent (i.e., around the principal rotational axis 9). The shroud 108 forms a circumferential segment at a tip of the turbine blade 102, such that, in operation, the shrouds of circumferentially adjacent turbine blades are arranged to meet circumferentially to together form an annular shroud of the turbine 100. A purpose of the annular shroud is to minimise leakage of hot working gases from within the row of turbine blades. The shroud 108 also provides a protective barrier to protect components outside the blade row from the high temperatures of the hot working gases.

FIGS. 3A-3D illustrate different perspective views of the turbine blade 102, according to an embodiment of the present disclosure. Some components of the turbine blade 102 are not shown in FIGS. 3A-3D for illustrative purposes. The shroud 108 includes a first abutment surface 110 and a second abutment surface 112 circumferentially spaced apart from and opposite to the first abutment surface 110. Both the first abutment surface 110 and the second abutment surface 112 are axially extending (i.e., they have an extent along the principal rotational axis 9 shown in FIG. 1). Therefore, the first and second abutment surfaces 110, 112 are spaced apart from each other with respect to the circumferential direction C. Further, each of the first and second abutment surfaces 110, 112 at least extend along the axial direction A. The shroud 108 further includes an inner platform surface 114 extending at least circumferentially between the first abutment surface 110 and the second abutment surface 112. Therefore, the inner platform surface 114 extends at least along the circumferential direction C between the first abutment surface 110 and the second abutment surface 112. The inner platform surface 114 is disposed adjacent to the aerofoil 56. The inner platform surface 114 is arranged at a radially inner portion of the shroud 108 and delimits a main flow path for a working gas through the turbine 100.

The shroud 108 includes an outer platform surface 116 radially spaced apart from the inner platform surface 114. Therefore, the outer platform surface 116 is spaced apart from the inner platform surface 114 with respect to the radial direction R. The outer platform surface 116 extends at least circumferentially between the first abutment surface 110 and the second abutment surface 112. Therefore, the outer platform surface 116 extends at least along the circumferential direction C between the first abutment surface 110 and the second abutment surface 112. The shroud 108 includes at least one fin 118, extending radially outward from the outer platform surface 116 and extending generally along the circumferential direction C between the first and second abutment surfaces 110, 112. In use, the at least one fin 118 act to minimise leakage of hot working gases between the outer platform surface 116 and a liner (not shown) of a turbine casing. The at least one fin 118 may separate multiple axially adjacent sections of the outer platform surface 116 along the shroud 108.

In some embodiments, the shroud 108 further includes a trailing surface 120 extending at least circumferentially between the first abutment surface 110 and the second abutment surface 112. Therefore, the trailing surface 120 extends at least along the circumferential direction C between the first abutment surface 110 and the second abutment surface 112. The trailing surface 120 further extends at least radially between the inner platform surface 114 and the outer platform surface 116. Therefore, the trailing surface 120 extends at least along the radial direction R between the inner platform surface 114 and the outer platform surface 116. The shroud 108 further includes a leading surface 122 axially spaced apart from the trailing surface 120 and extending at least circumferentially between the first abutment surface 110 and the second abutment surface 112. Therefore, the leading surface 122 is spaced apart from the trailing surface 120 with respect to the axial direction A and extends at least along the circumferential direction C between the first abutment surface 110 and the second abutment surface 112. The leading surface 122 further extends at least radially between the inner platform surface 114 and the outer platform surface 116. Therefore, the leading surface 122 extends at least along the radial direction R between the inner platform surface 114 and the outer platform surface 116.

In some embodiments, the shroud 108 further includes a shroud leading edge 124 formed at an intersection between the leading surface 122 and the inner platform surface 114. The shroud leading edge 124 extends circumferentially along the leading surface 122. In some embodiments, the shroud 108 further includes a shroud trailing edge 126 formed at an intersection between the trailing surface 120 and the inner platform surface 114. The shroud trailing edge 126 extends circumferentially along the trailing surface 120.

In the illustrated embodiment of FIGS. 3A-3D, the shroud 108 further includes a first abutment edge 128 formed at an intersection between the first abutment surface 110 and the inner platform surface 114. The shroud 108 further includes a second abutment edge 130 formed at an intersection between the second abutment surface 112 and the inner platform surface 114.

The shroud 108 further includes a first recessed surface 132 extending at least radially and circumferentially from the first abutment surface 110 to the inner platform surface 114. Therefore, the first recessed surface 132 extends at least along the radial direction R and the circumferential direction C from the first abutment surface 110 to the inner platform surface 114. The first recessed surface 132 is radially spaced apart from the outer platform surface 116 and extends at least axially along at least a portion of the first abutment surface 110. Therefore, the first recessed surface 132 is spaced apart from the outer platform surface 116 with respect to the radial direction R and extends at least along the axial direction A along at least the portion of the first abutment surface 110. In the illustrated embodiment of FIGS. 3A-3D, the first recessed surface 132 extends at least axially along the portion of the first abutment surface 110 from the trailing surface 120 towards the leading surface 122, such that the first recessed surface 132 is at least axially spaced apart from the leading surface 122. Therefore, in the illustrated embodiment of FIGS. 3A-3D, the first recessed surface 132 is spaced apart from the leading surface 122 at least along the axial direction A. The first recessed surface 132 defines a first recessed region 133.

In the illustrated embodiment of FIGS. 3A-3D, the first recessed surface 132 intersects the first abutment edge 128 and the shroud trailing edge 126. Further, in some embodiments (as shown in FIGS. 3A-3D), the first recessed surface 132 has a planar shape.

Figure 3B:
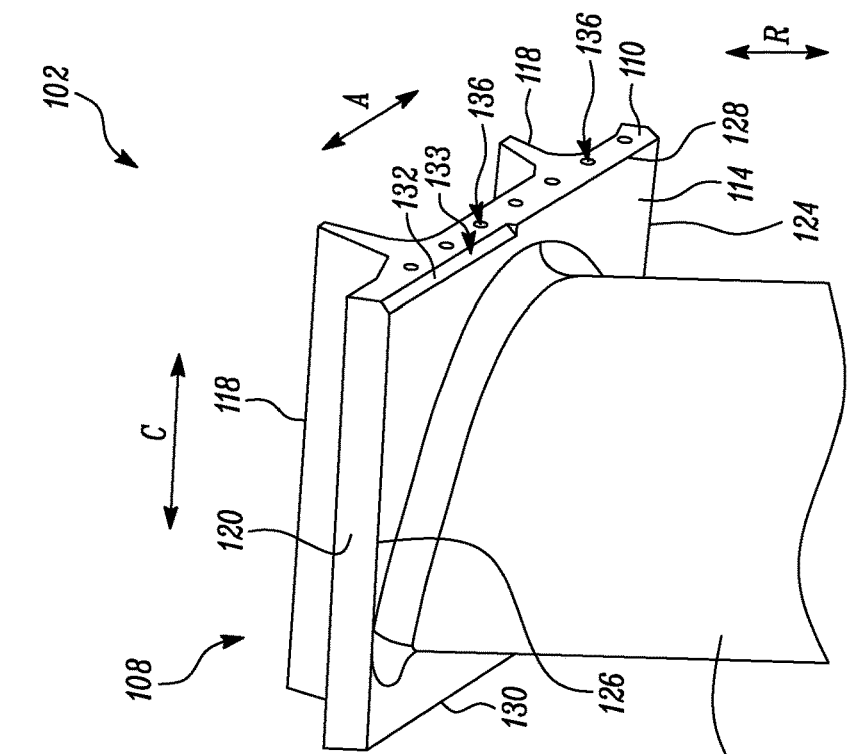
FIGS. 3A-3D are different perspective views of a turbine blade of the turbine of FIG. 2, according to an embodiment of the present disclosure.
Figure 3A:
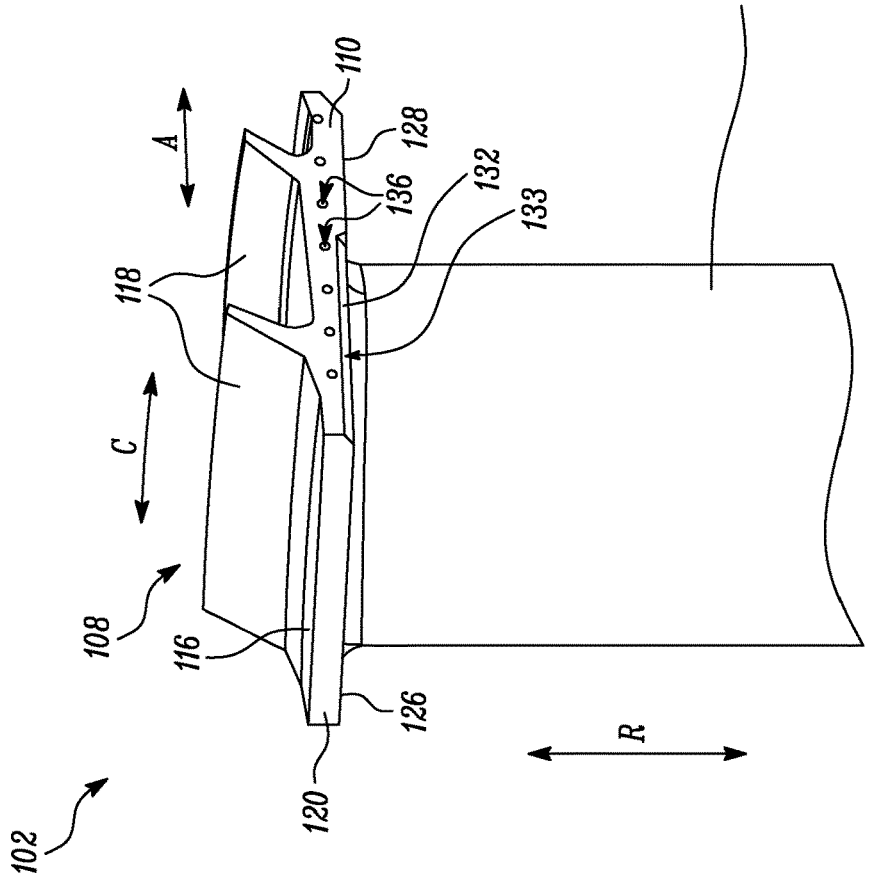
Figure 3C:
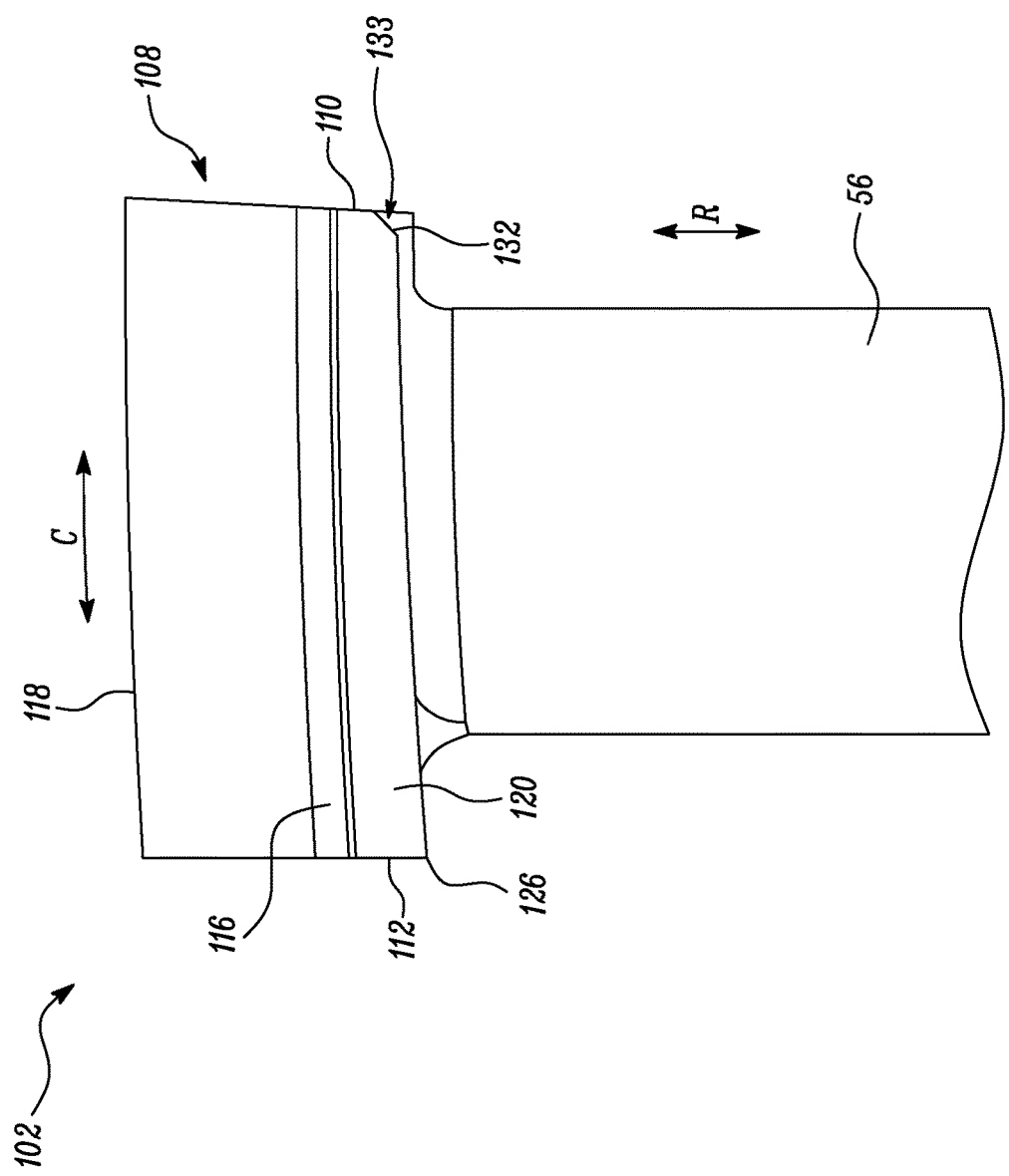
Figure 3D:
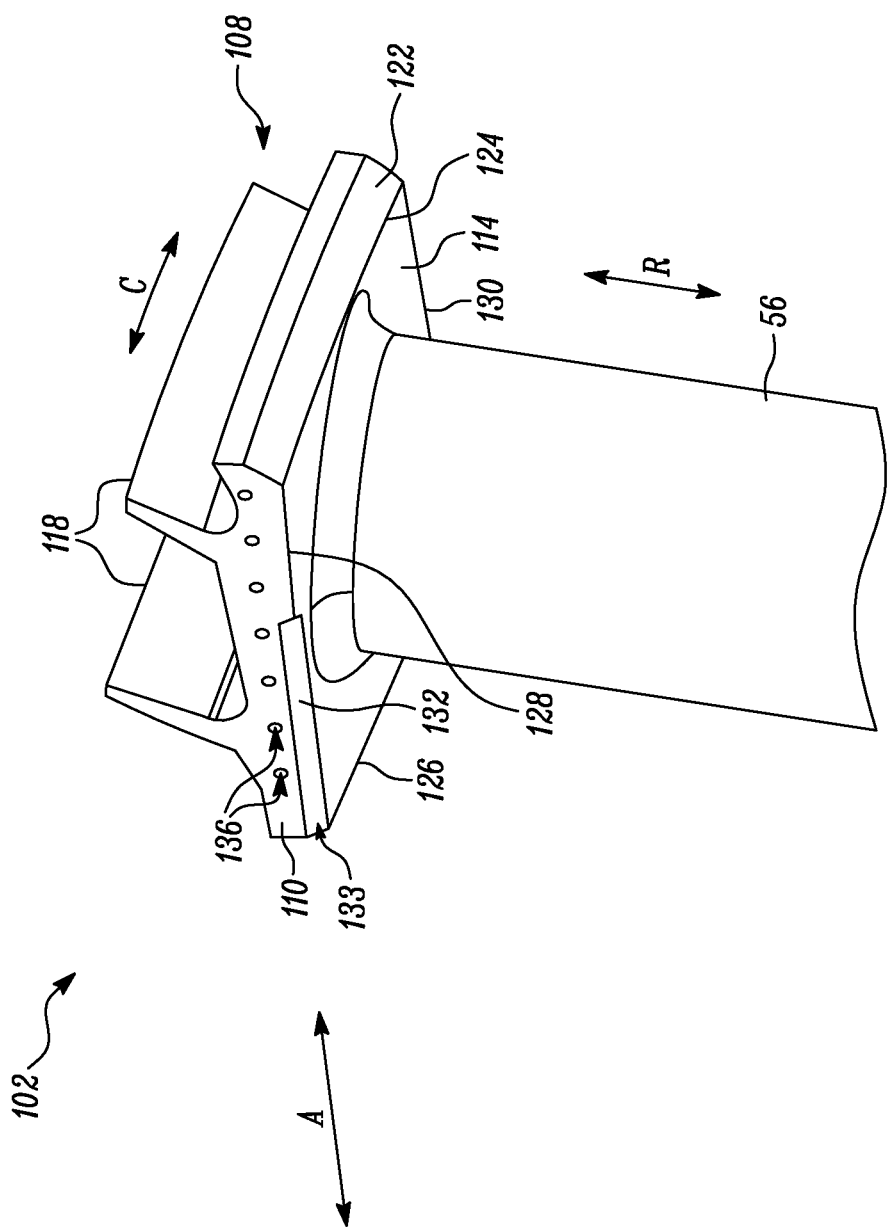
Figure 4:
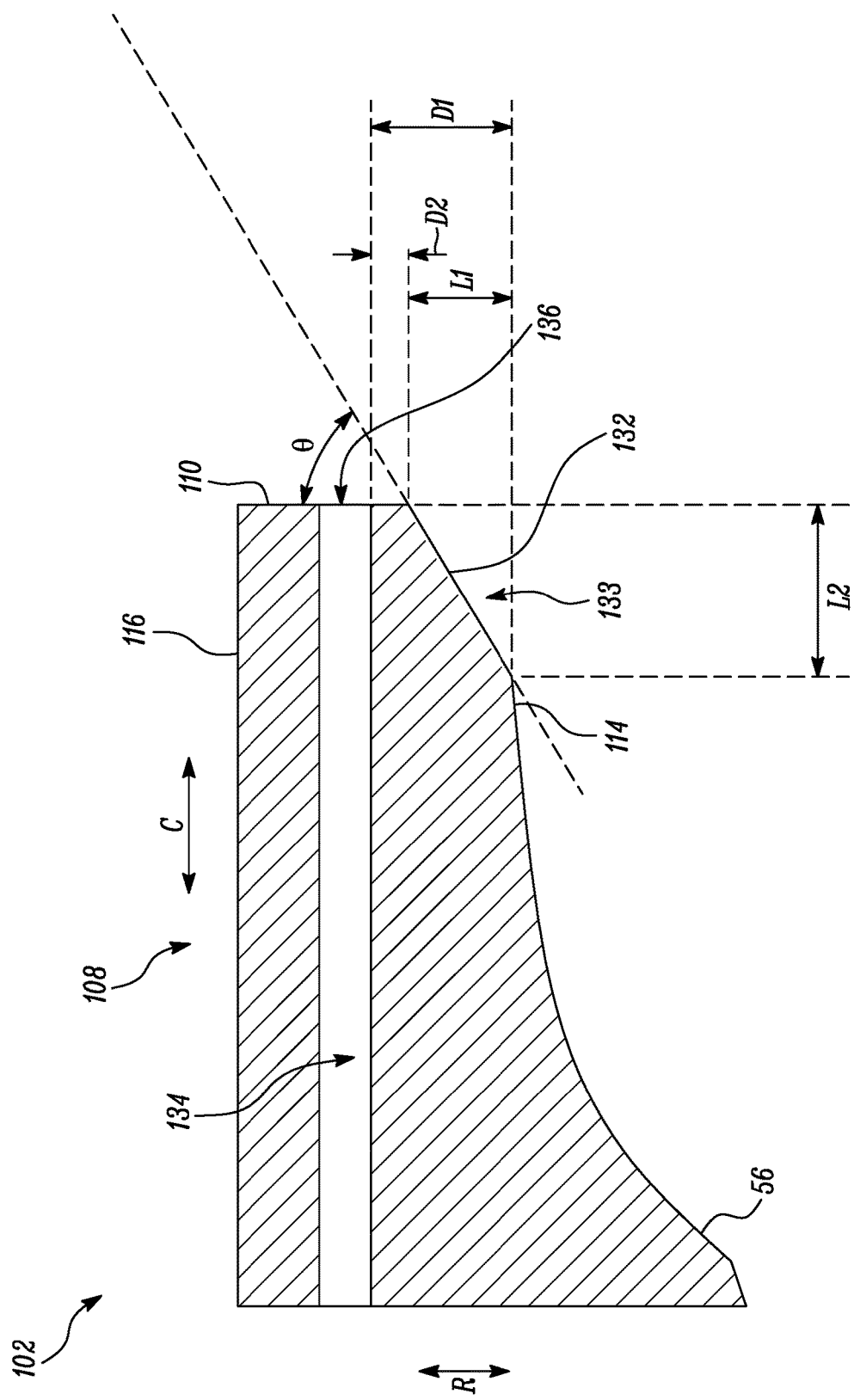
FIG. 4 is a cross-sectional view of a portion of the turbine blade of FIG. 3A, according to an embodiment of the present disclosure.

FIG. 4 is a cross-sectional view of a portion of the turbine blade 102 along the circumferential direction C, according to an embodiment of the present disclosure. With reference to FIGS. 3A and 4, the shroud 108 further includes at least one first internal cooling passage 134 and at least one first passage opening 136 disposed on the first abutment surface 110. The at least one first internal cooling passage 134 extends from the at least one first passage opening 136, such that the at least one first internal cooling passage 134 is configured to discharge a flow of a cooling fluid through the at least one first passage opening 136. The cooling fluid flows through the at least one first internal cooling passage 134 to cool the components of the turbine blade 102. Further, the first recessed surface 132 is spaced apart and fluidly separate from the at least one first passage opening 136. Specifically, the first recessed surface 132 is at least radially spaced apart from the at least one first passage opening 136. Therefore, the first recessed surface 132 is spaced apart from the at least one first passage opening 136 at least along the radial direction R.

The first recessed surface 132 has a maximum radial length L1 along the radial direction R. In some embodiments, the maximum radial length L1 of the first recessed surface 132 is from 5% to 90% of a minimum radial distance D1 between the at least one first passage opening 136 and the inner platform surface 114. In the illustrated embodiment of FIG. 4, the maximum radial length L1 is from 60% to 90% of the minimum radial distance D1. In some embodiments, the maximum radial length L1 is about 75% of the minimum radial distance D1.

In some embodiments, a minimum radial distance D2 between the first recessed surface 132 and the at least one first passage opening 136 is from 10% to 95% of the minimum radial distance D1 between the at least one first passage opening 136 and the inner platform surface 114. In the illustrated embodiment of FIG. 4, the minimum radial distance D2 is from 10% to 40% of the minimum radial distance D1. In some embodiments, the minimum radial distance D2 is about 25% of the minimum radial distance D1. In some embodiments, the minimal radial distance D2 is less than the maximum radial length L1 of the first recessed surface 132.

The first recessed surface 132 has a maximum circumferential length L2 along the circumferential direction C. In some embodiments, a ratio of the maximum radial length L1 of the first recessed surface 132 to the maximum circumferential length L2 of the first recessed surface 132 is from 0.15:1 to 3:1. In the illustrated embodiment of FIG. 4, the ratio of the maximum radial length L1 to the maximum circumferential length L2 is from 0.5:1 to 1:1. Further, in some embodiments (as shown in FIG. 4), the first recessed surface 132 is inclined at an inclination angle θ with respect to the first abutment surface 110. The inclination angle θ may be an oblique angle. The inclination angle θ is from 20 degrees to 80 degrees. In some embodiments, the inclination angle θ is from 30 degrees to 70 degrees.

Figure 5A:
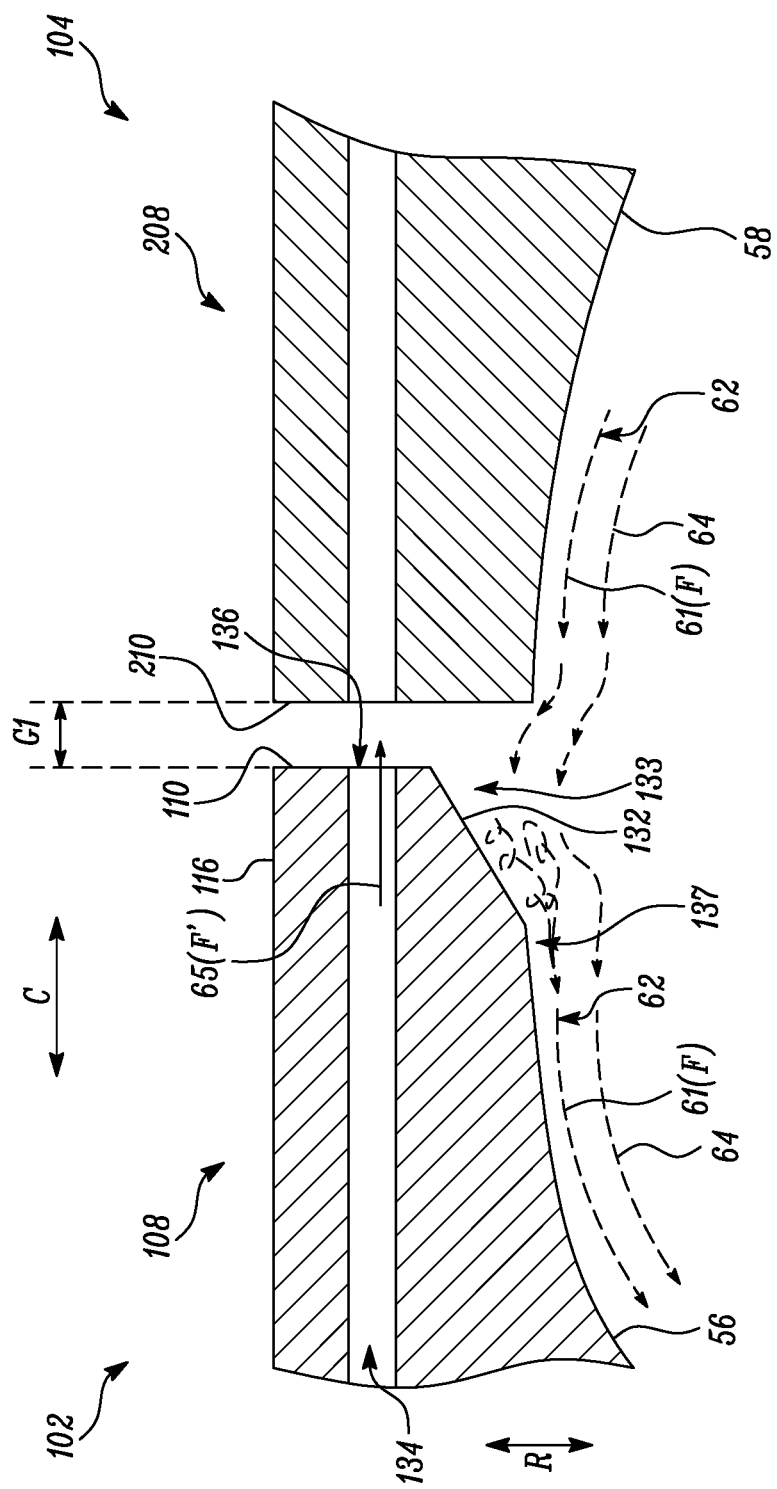
FIG. 5A is a cross-sectional view of the portion of the turbine blade of FIG. 4 and a portion of a first circumferentially adjacent turbine blade, according to an embodiment of the present disclosure.

FIG. 5A is a cross-sectional view of the portion (shown in FIG. 4) of the turbine blade 102 and a portion of the first circumferentially adjacent turbine blade 104, according to an embodiment of the present disclosure. The first circumferentially adjacent turbine blade 104 includes an aerofoil 58 and a first adjacent shroud 208 attached to the aerofoil 58. The first adjacent shroud 208 includes a second abutment surface 210. With reference to FIGS. 2 and 5A, the first abutment surface 110 of the turbine blade 102 from the plurality of turbine blades is configured to face the second abutment surface 210 of the first circumferentially adjacent turbine blade 104 from the plurality of turbine blades.

During operation of the turbine 100, the turbine blade 102 receives a cooling fluid F from the first circumferentially adjacent turbine blade 104. Specifically, the turbine blade 102 is configured to receive a flow 61 (indicated by arrows in FIG. 5A) of the cooling fluid F from the first circumferentially adjacent turbine blade 104. The flow 61 of the cooling fluid F may form a cooling film layer 62.

In some cases, upon assembling the plurality of turbine blades in the turbine 100, the first abutment surface 110 of the turbine blade 102 and the second abutment surface 210 of the first circumferentially adjacent turbine blade 104 form a first gap G1 therebetween. The first gap G1 is a circumferential gap along the circumferential direction C. The first gap G1 may be formed due to manufacturing tolerances of the first circumferentially adjacent turbine blade 104 and the turbine blade 102. The first recessed region 133 of the first recessed surface 132 of the turbine blade 102 is configured to receive the flow 61 of the cooling fluid F from the first circumferentially adjacent turbine blade 104 and at least partially reduce a leakage of the cooling fluid F through the first gap G1.

Therefore, the first recessed surface 132 extending from the first abutment surface 110 forms a shallow trench immediately downstream of the first gap G1 with respect to the flow 61 of the cooling fluid F. The shallow trench may be formed in the first recessed region 133 defined by the first recessed surface 132. The shallow trench formed by the first recessed surface 132 may cause the cooling film layer 62 to flow to a downstream side 137 of the first recessed surface 132 towards the aerofoil 56. Specifically, the first recessed region 133 may receive the flow 61 of the cooling fluid F from the first circumferentially adjacent turbine blade 104 and impede the flow 61 of the cooling fluid F from entering the first gap G1. The inclusion of the first recessed surface 132 may help to resume or continue the flow of the cooling film layer 62 that could have otherwise escaped or leaked through the first gap G1 in the conventional turbine blades assembly.

The formation of the first recessed surface 132 may cause a minimal bending of the cooling film layer 62 towards the first gap G1. In this way, as compared to the conventional designs of the turbine blades, a relatively greater portion of the cooling film layer 62 flows from the first circumferentially adjacent turbine blade 104 to the turbine blade 102 without leaking into the first gap G1. Thus, the cooling film layer 62 may provide an improved cooling to the turbine blade 102. The inclusion of the first recessed surface 132 may allow the cooling fluid F to flow close to areas of the shroud 108 that may otherwise be susceptible to hotspots, and in particular close to the inner platform surface 114 for conductive cooling through the thickness of the shroud 108.

As majority of the cooling fluid F in the cooling film layer 62 passes from the first circumferentially adjacent turbine blade 104 to the turbine blade 102 without leaking into the first gap G1, there are low chances of impingement of hot gases (indicated by an arrow 64) on metal surfaces of the turbine blade 102. This may prevent over-heating of the turbine blade 102 due to improved cooling and therefore extend a useful lifetime of the turbine blade 102 for improved reliability. In contrast to the conventional turbine blades, a relatively less impingement of the hot gases on the turbine blade 102 may prevent oxidation of the metal surfaces. This may further reduce an overall deterioration of the turbine blade material and improve a performance of the turbine blade 102 and the turbine 100.

The cooling provided by the cooing film layer 62 may also prevent excessive wear of the turbine blade 102 during operation of the turbine 100. Further, due to improved cooling of the turbine blade 102, thermal stress and geometrical deformations, to which the turbine blades are usually subjected to in conventional designs, may be kept low. The reduced thermal stress on the turbine blade 102 may further increase an overall efficiency of the turbine 100.

FIG. 5A further illustrates a flow 65 of a cooling fluid F'. The at least one first internal cooling passage 134 discharges the flow 65 of the cooling fluid F' through the at least one first passage opening 136. The cooling fluid F' may be similar to or different from the cooling fluid F'. The radial spacing between the first recessed surface 132 and the at least one first passage opening 136 may significantly reduce or prevent interference between the flow 65 of the cooling fluid F' and the cooling film layer 62. Such interference may otherwise disrupt the cooling film layer 62 and adversely impact the cooling and shielding provided by the cooling film layer 62.

Figure 5B:
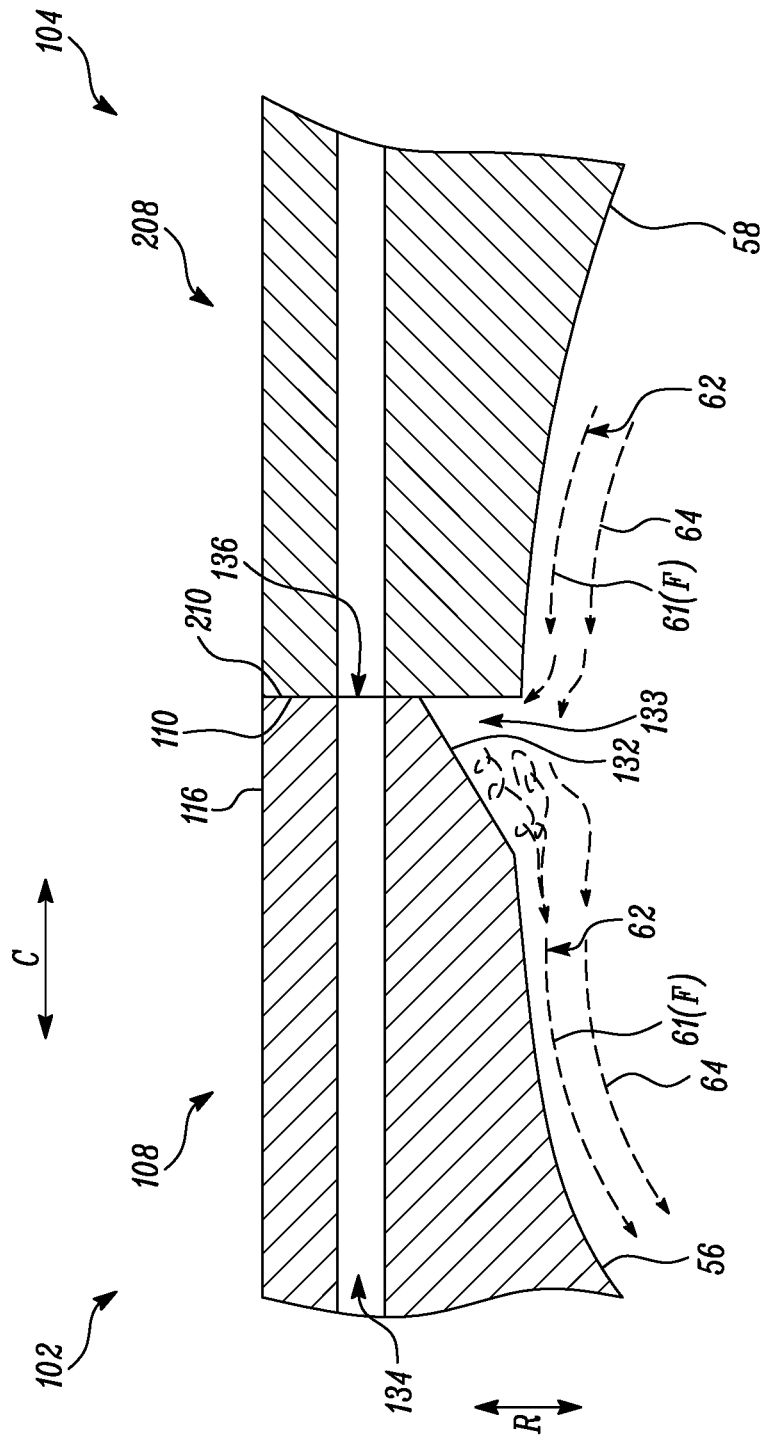
FIG. 5B is a cross-sectional view of the portion of the turbine blade of FIG. 4 and the portion of the first circumferentially adjacent turbine blade, according to another embodiment of the present disclosure.

FIG. 5B is a cross-sectional view of the portion (shown in FIG. 4) of the turbine blade 102 and the portion of the first circumferentially adjacent turbine blade 104 (shown in FIG. 5A), according to another embodiment of the present disclosure. In the illustrated embodiment of FIG. 5B, the first abutment surface 110 of the turbine blade 102 faces and at least partially abuts the second abutment surface 210 of the first circumferentially adjacent turbine blade 104. As the first abutment surface 110 of the turbine blade 102 at least partially abuts the second abutment surface 210 of the first circumferentially adjacent turbine blade 104, there is no circumferential gap between the shroud 108 of the turbine blade 102 and the first adjacent shroud 208 of the first circumferentially adjacent turbine blade 104.

Figure 5C:
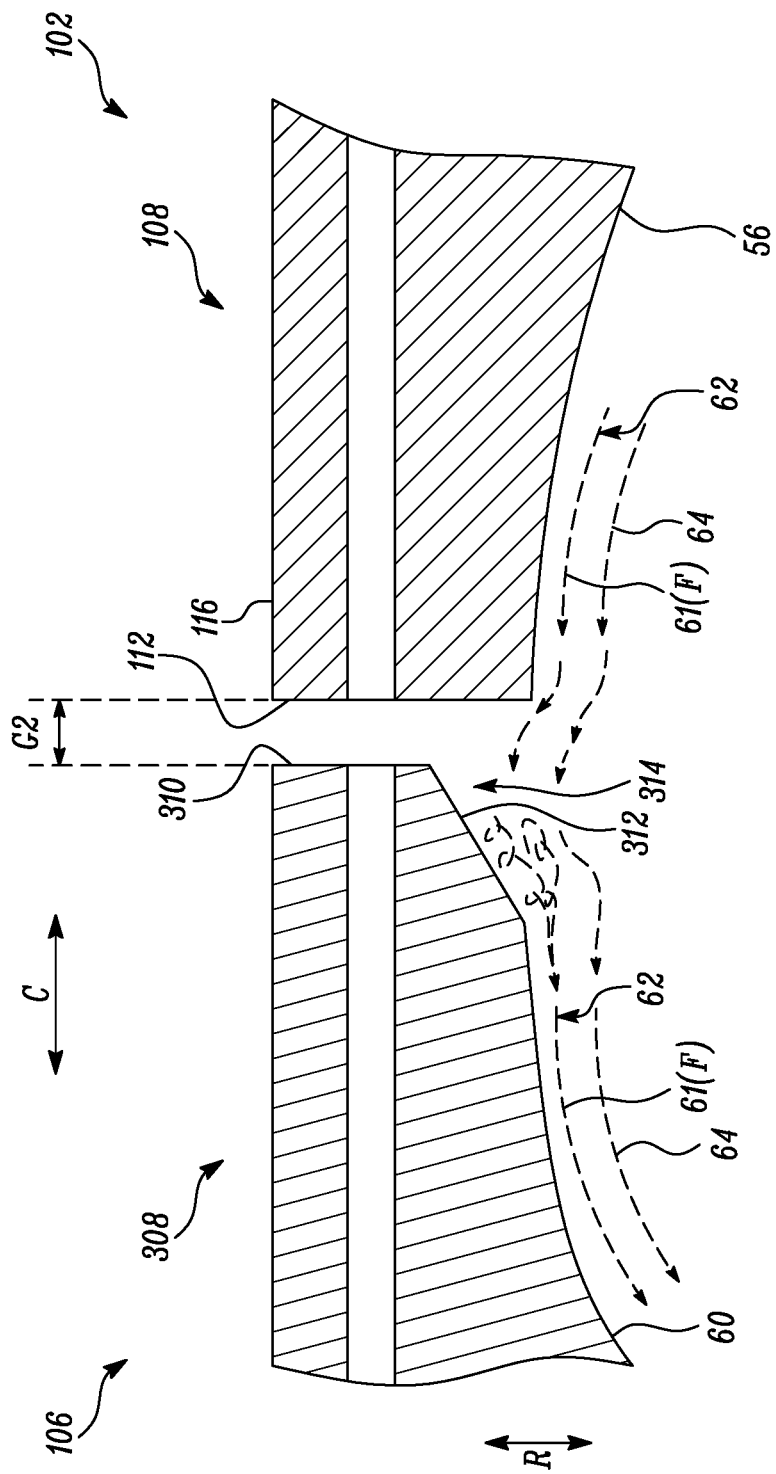
FIG. 5C is a cross-sectional view of the portion of the turbine blade of FIG. 4 and a portion of a second circumferentially adjacent turbine blade, according to an embodiment of the present disclosure.

FIG. 5C is a cross-sectional view of the portion (shown in FIG. 4) of the turbine blade 102 and a portion of the second circumferentially adjacent turbine blade 106, according to an embodiment of the present disclosure. The second circumferentially adjacent turbine blade 106 includes an aerofoil 60 and a second adjacent shroud 308 attached to the aerofoil 60. The second adjacent shroud 308 includes a first abutment surface 310. With reference to FIGS. 2 and 5C, the second abutment surface 112 of the turbine blade 102 from the plurality of turbine blades is configured to face the first abutment surface 310 of the second circumferentially adjacent turbine blade 106 from the plurality of turbine blades.

During operation of the turbine 100, the second circumferentially adjacent turbine blade 106 receives the cooling fluid F from the turbine blade 102. Specifically, the second circumferentially adjacent turbine blade 106 is configured to receive the cooling film layer 62 comprising the cooling fluid F from the turbine blade 102.

In some cases, upon assembling the plurality of turbine blades in the turbine 100, the second abutment surface 112 of the turbine blade 102 and the first abutment surface 310 of the second circumferentially adjacent turbine blade 106 form a second gap G2 therebetween. The second gap G2 may be formed due to manufacturing tolerances of the second circumferentially adjacent turbine blade 106 and the turbine blade 102. The second adjacent shroud 308 of the second circumferentially adjacent turbine blade 106 also includes a recessed surface 312 defining a recessed region 314. The recessed surface 312 may be substantially similar in geometry to the first recessed surface 132 of the shroud 108 of the turbine blade 102.

The recessed surface 312 of the second circumferentially adjacent turbine blade 106 is configured to receive a flow (i.e., the flow 61) of the cooling fluid F from the turbine blade 102 and at least partially reduce a leakage of the cooling fluid through the second gap G2. Specifically, the recessed surface 312 of the second circumferentially adjacent turbine blade 106 receives the cooing film layer 62 from the turbine blade 102. The recessed surface 312 may also provide a similar functional advantage as the second circumferentially adjacent turbine blade 106 that is provided by the first recessed surface 132 to the turbine blade 102.

With reference to FIGS. 5A and 5C, the recessed region 314 of the recessed surface 312 of the second circumferentially adjacent turbine blade 106 receives the cooing fluid F from the turbine blade 102. Further, the recessed surface 312 at least partially reduces the leakage of the cooling fluid F through the second gap G2. The first recessed region 133 of the first recessed surface 132 of the turbine blade 102 receives the cooling fluid F from the first circumferentially adjacent turbine blade 104. Further, the first recessed surface 132 at least partially reduces the leakage of the cooling fluid F through the first gap G1. Therefore, fora plurality of turbine blades (e.g., the turbine blades 102, 104, 106), a recessed region of a recessed surface of each turbine blade is configured to receive a cooling fluid from an circumferentially adjacent turbine blade and at least partially reduce a leakage of the cooling fluid through a circumferential gap between the corresponding turbine blade and the circumferentially adjacent turbine blade.

Figure 5D:
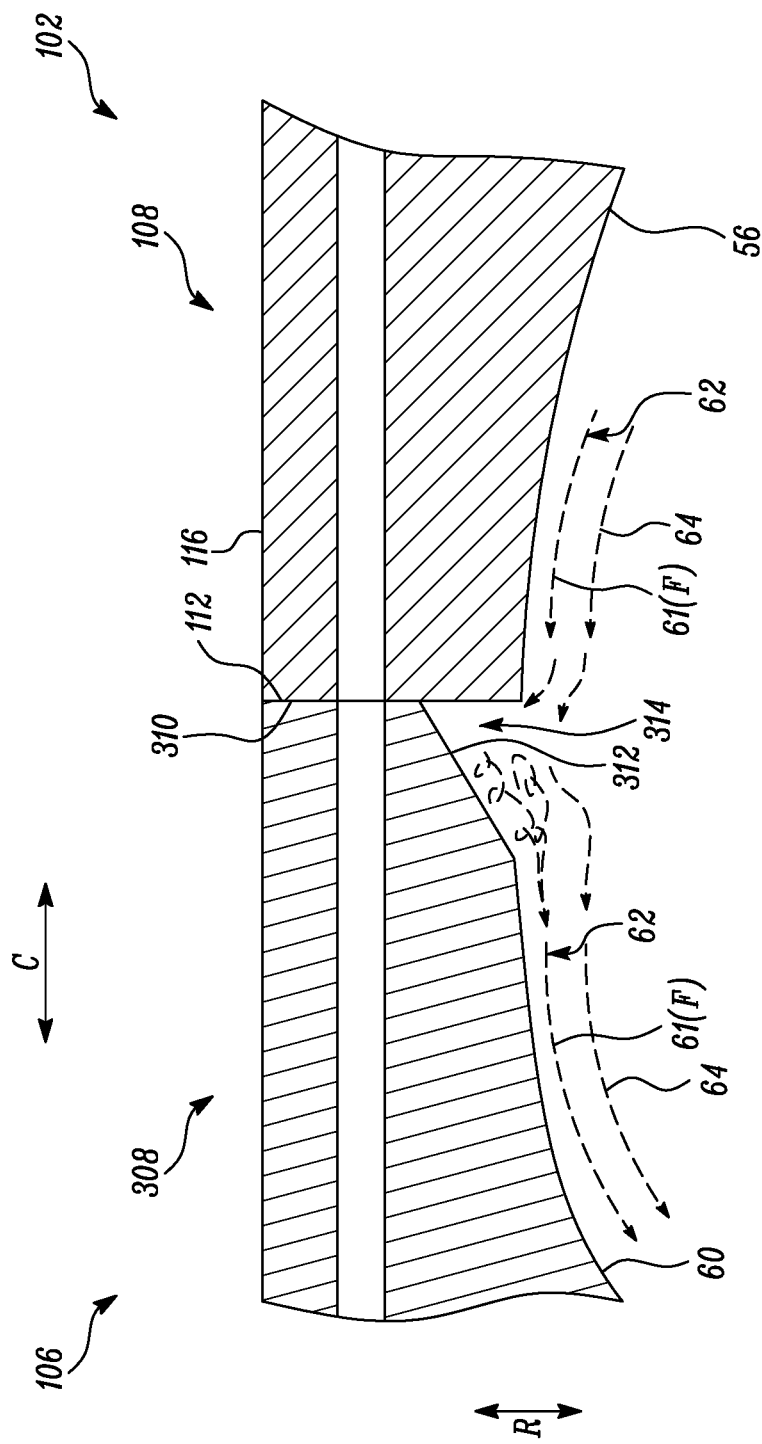
FIG. 5D is a cross-sectional view of the portion of the turbine blade of FIG. 4 and the portion of the second circumferentially adjacent turbine blade, according to another embodiment of the present disclosure.

FIG. 5D is a cross-sectional view of the portion (shown in FIG. 4) of the turbine blade 102 and the portion of the second circumferentially adjacent turbine blade 106 (shown in FIG. 5C), according to another embodiment of the present disclosure. In the illustrated embodiment of FIG. 5D, the second abutment surface 112 of the turbine blade 102 faces and at least partially abuts the first abutment surface 310 of the second circumferentially adjacent turbine blade 106. As the second abutment surface 112 of the turbine blade 102 at least partially abuts the first abutment surface 310 of the second circumferentially adjacent turbine blade 106, there is no circumferential gap between the shroud 108 of the turbine blade 102 and the second adjacent shroud 308 of the second circumferentially adjacent turbine blade 106.

Figure 6:
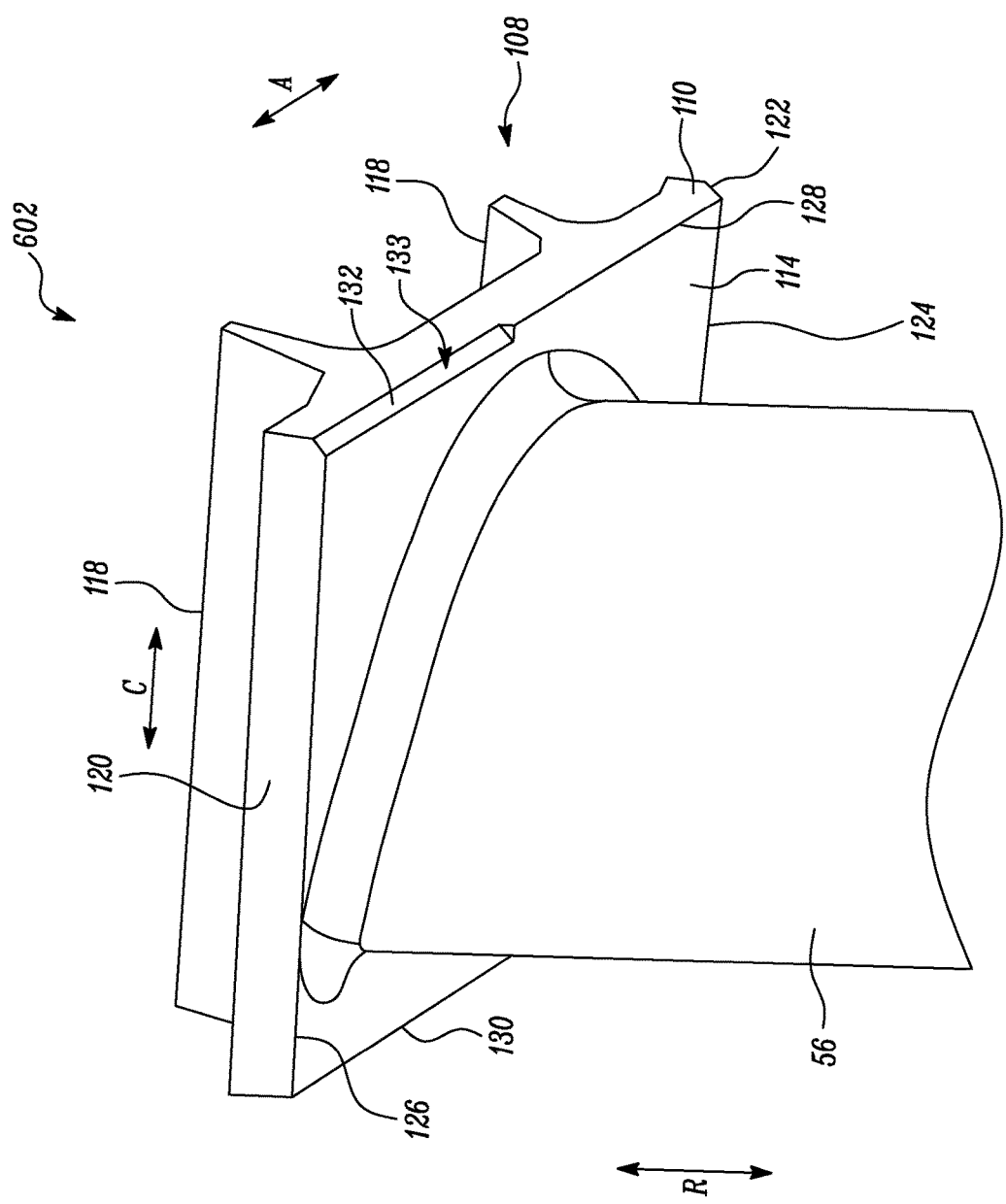
FIG. 6 is a partial perspective view of a turbine blade of the turbine of FIG. 2, according to an embodiment of the present disclosure.

FIG. 6 is a partial perspective view of a turbine blade 602 of the turbine 100 (shown in FIG. 2), according to an embodiment of the present disclosure. The turbine blade 602 is substantially similar to the turbine blade 102 illustrated in FIG. 3A, with common components being referred to by the same reference numerals. However, in the turbine blade 602, the shroud 108 does not include any internal cooling passage and corresponding passage opening.

Figure 7:
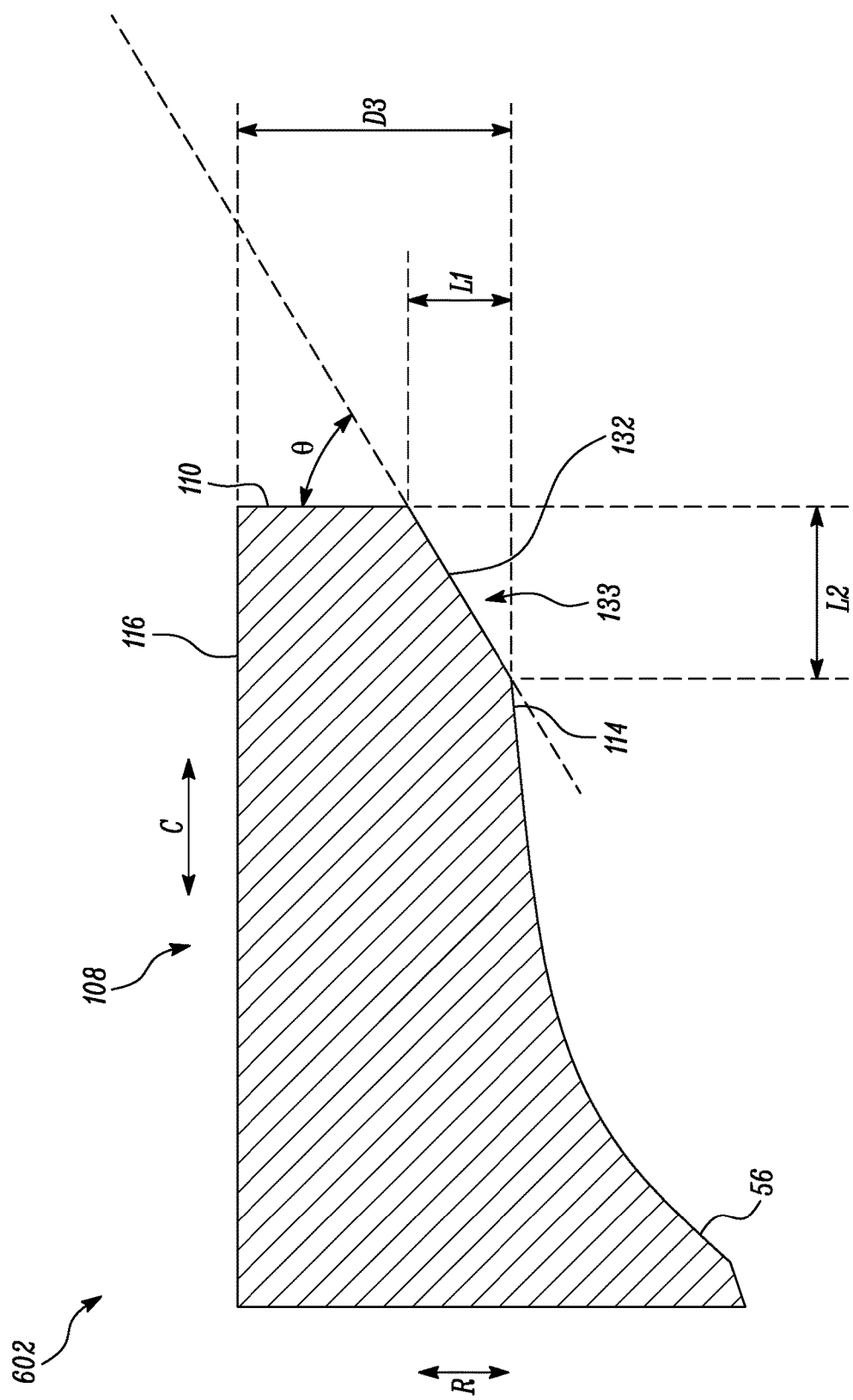
FIG. 7 is a cross-sectional view of a portion of the turbine blade of FIG. 6, according to an embodiment of the present disclosure.

FIG. 7 is a cross-sectional view of a portion of the turbine blade 602, according to an embodiment of the present disclosure. With reference to FIGS. 6 and 7, the ratio of the maximum radial length L1 of the first recessed surface 132 to the maximum circumferential length L2 of the first recessed surface 132 is from 0.15:1 to 3:1. In the illustrated embodiment of FIG. 7, the ratio of the maximum radial length L1 to the maximum circumferential length L2 is from 0.5:1 to 1:1. Further, the first recessed surface 132 is inclined at the inclination angle θ with respect to the first abutment surface 110. The inclination angle θ is from 20 degrees to 80 degrees. In some embodiments, the inclination angle θ is from 30 degrees to 70 degrees.

In some embodiments, the maximum radial length L1 of the first recessed surface 132 is from 5% to 50% of a maximum radial distance D3 between the outer platform surface 116 and the first recessed surface 132. The maximum radial distance D3 is measured along the radial direction R. In the illustrated embodiment of FIG. 7, the maximum radial length L1 of the first recessed surface 132 is from 25% to 40% of the maximum radial distance D3. Further, since the first recessed surface 132 extends to the inner platform surface 114, the maximum radial distance D3 between the outer platform surface 116 and the first recessed surface 132 may correspond to a minimum radial distance between the outer platform surface 116 and the inner platform surface 114.

Figure 8A:
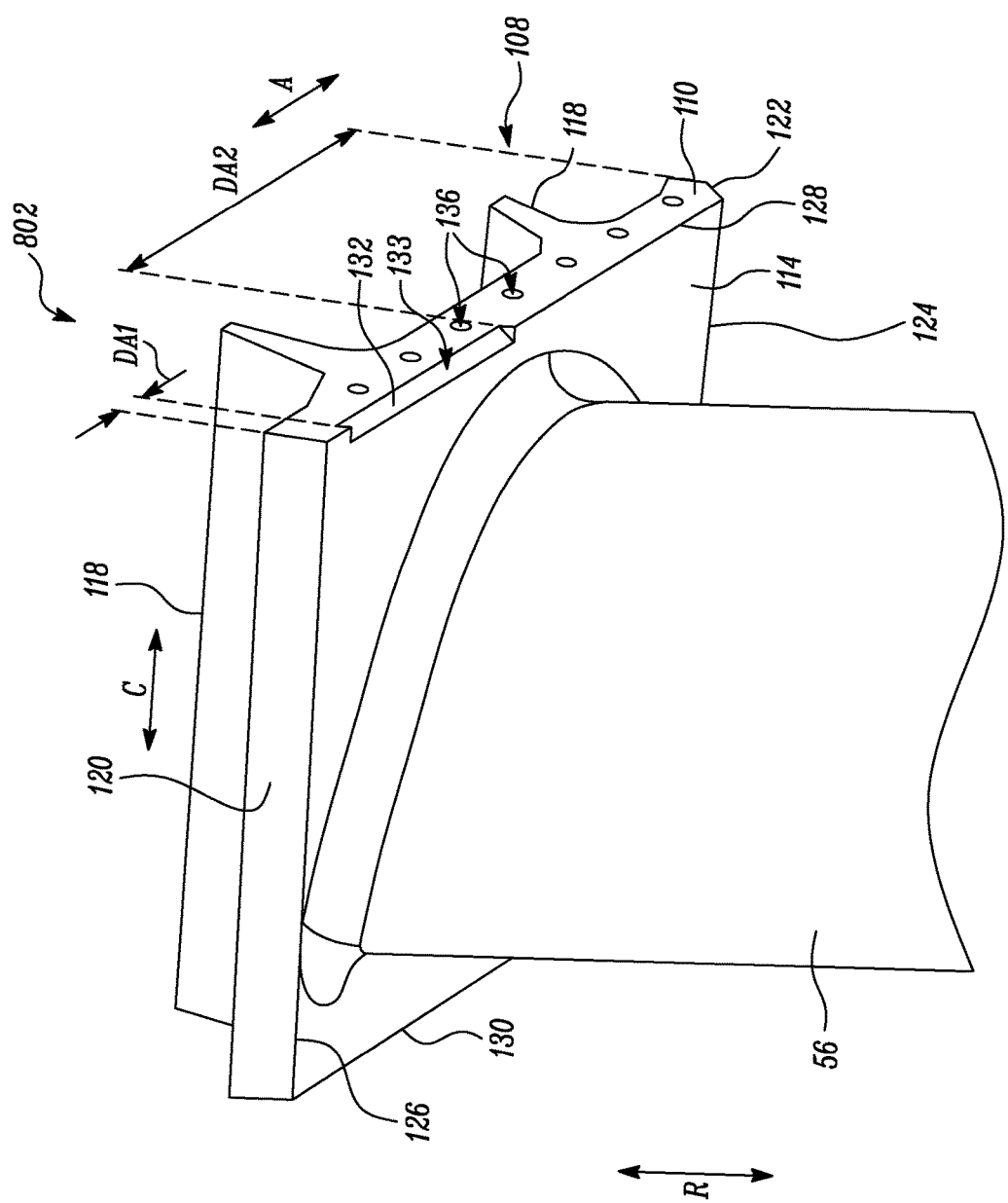
FIG. 8A is a partial perspective view of a turbine blade of the turbine of FIG. 2, according to an embodiment of the present disclosure.

FIG. 8A is a perspective view of a turbine blade 802 of the turbine 100 (shown in FIG. 2), according to an embodiment of the present disclosure. The turbine blade 802 is substantially similar to the turbine blade 102 illustrated in FIG. 3A, with common components being referred to by the same reference numerals. However, in the turbine blade 802, the first recessed surface 132 is at least axially spaced apart from each of the trailing surface 120 and the leading surface 122. Therefore, the first recessed surface 132 is spaced apart from each of the trailing surface 120 and the leading surface 122 at least along the axial direction A. A minimum axial distance DA1 between the trailing surface 120 and the first recessed surface 132 is less than a minimum axial distance DA2 between the first recessed surface 132 and the leading surface 122. Therefore, the first recessed surface 132 is closer to the trailing surface 120 than the leading surface 122 with respect to the axial direction A.

Figure 8B:
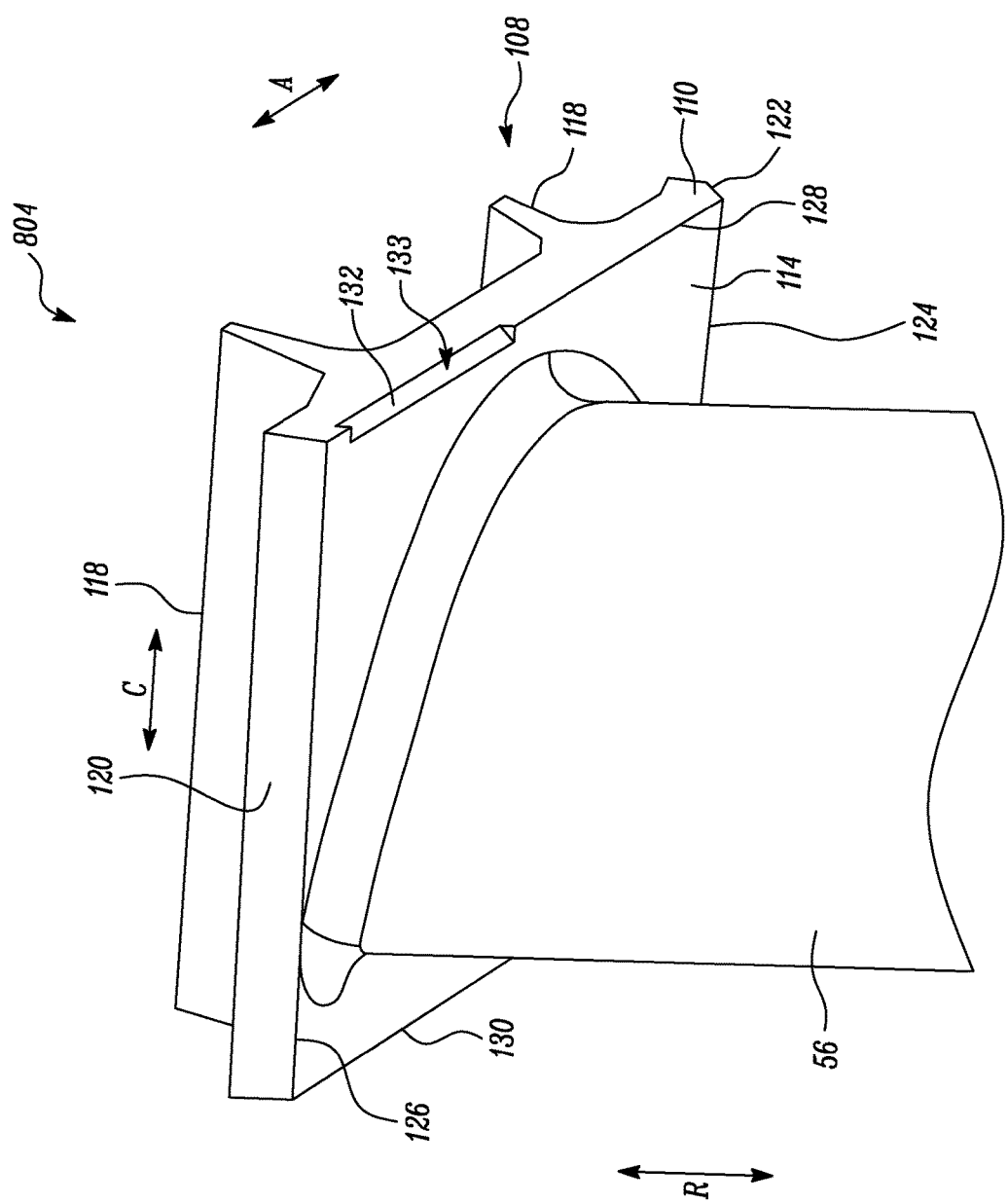
FIG. 8B is a partial perspective view of a turbine blade of the turbine of FIG. 2, according to another embodiment of the present disclosure.

FIG. 8B is a perspective view of a turbine blade 804 of the turbine 100 (shown in FIG. 2), according to an embodiment of the present disclosure. The turbine blade 804 is substantially similar to the turbine blade 802 illustrated in FIG. 8A, with common components being referred to by the same reference numerals. However, in the turbine blade 804, the shroud 108 does not include any internal cooling passage and corresponding passage opening.

Figures 9A, 9B:
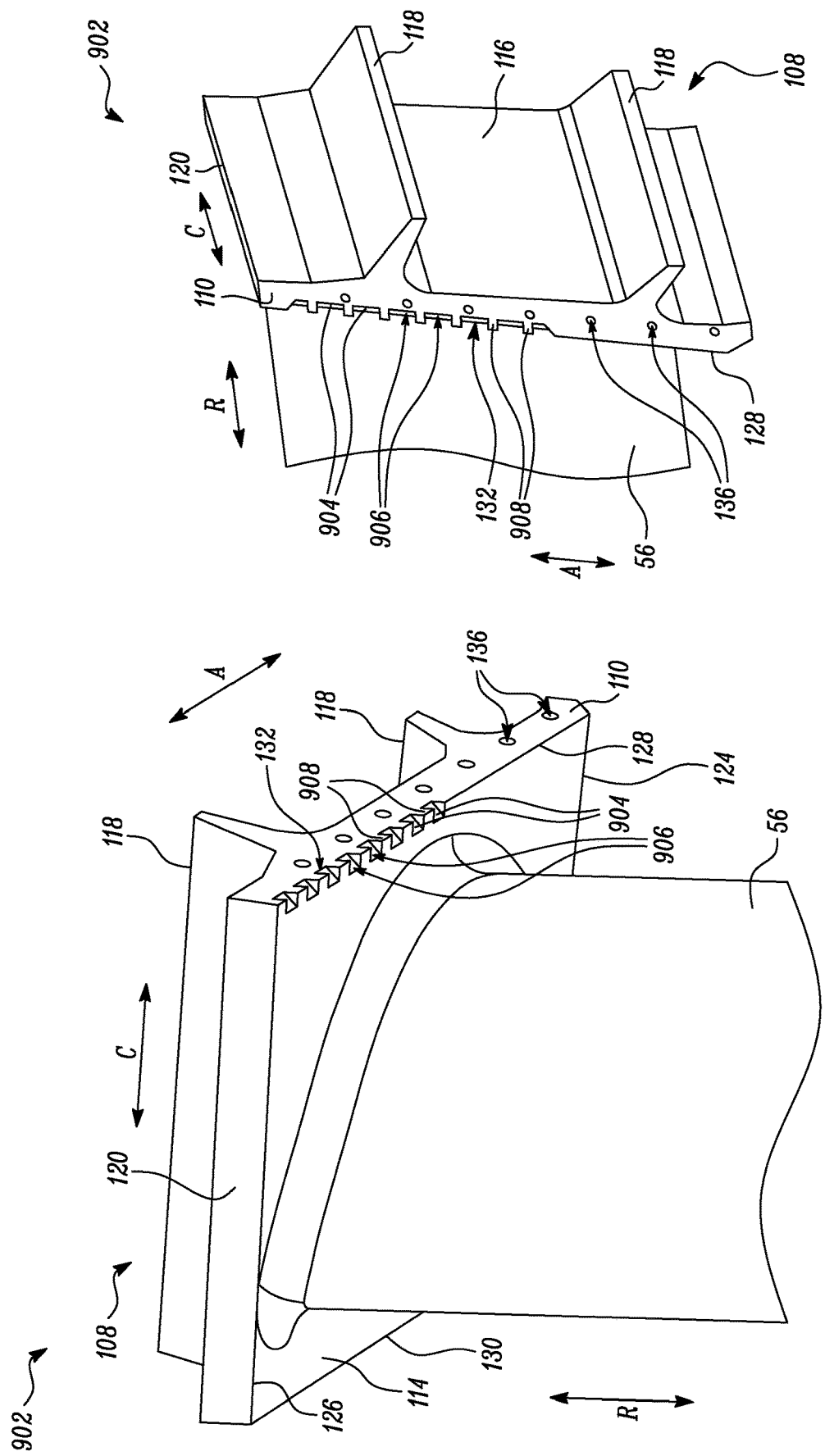
FIGS. 9A and 9B are partial perspective views of a turbine blade of the turbine of FIG. 2, according to an embodiment of the present disclosure.

FIGS. 9A and 9B are partial perspective views of a turbine blade 902 of the turbine 100 (shown in FIG. 2), according to an embodiment of the present disclosure. The turbine blade 902 is substantially similar to the turbine blade 102 illustrated in FIG. 2, with common components being referred to by the same reference numerals. However, in the turbine blade 902, the first recessed surface 132 includes a plurality of recessed surface portions 904 axially spaced apart from each other and defining a plurality of corresponding recessed regions 906. In some embodiments, the plurality of recessed surface portions 904 includes at least a total of five recessed surface portions 904. The shroud 108 further includes a plurality of walls 908 axially spaced apart from each other and extending from the first abutment surface 110 to the inner platform surface 114. Specifically, the plurality of walls 908 extend radially from the first abutment surface 110 to the inner platform surface 114. Each recessed surface portion 904 is formed between corresponding adjacent walls 908 from the plurality of walls 908.

Figures 9C, 9D:
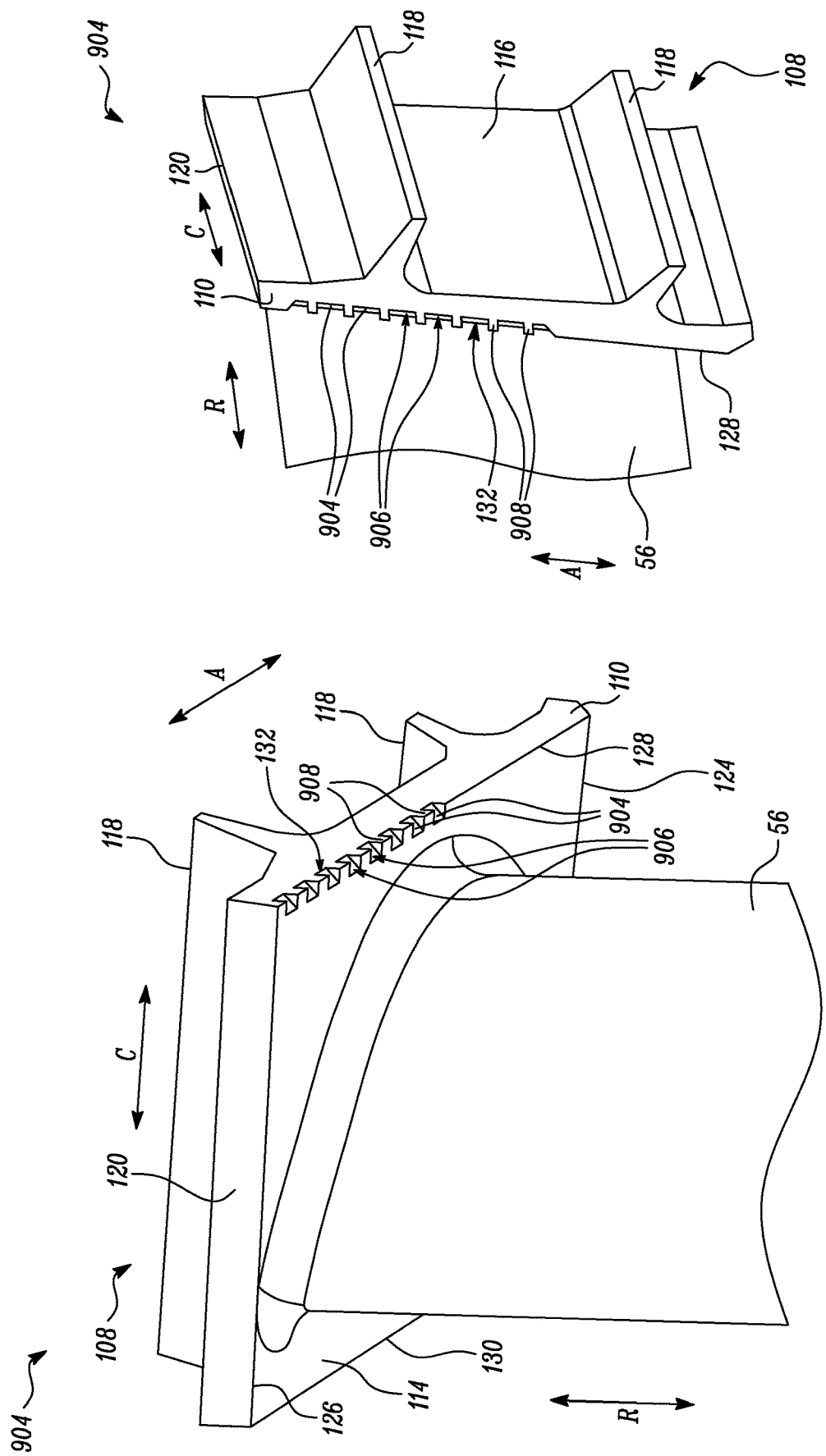
FIGS. 9C and 9D are partial perspective views of a turbine blade of the turbine of FIG. 2, according to another embodiment of the present disclosure.

FIGS. 9C and 9D are partial perspective views of a turbine blade 912 of the turbine 100 (shown in FIG. 2), according to an embodiment of the present disclosure. The turbine blade 912 is substantially similar to the turbine blade 902 illustrated in FIGS. 9A and 9B, with common components being referred to by the same reference numerals. However, in the turbine blade 912, the shroud 108 does not include any internal cooling passage and corresponding passage opening.

FIGS. 10A and 10B are partial perspective views of a turbine blade 1002 of the turbine 100 (shown in FIG. 2), according to an embodiment of the present disclosure. The turbine blade 1002 is substantially similar to the turbine blade 102 illustrated in FIG. 2, with common components being referred to by the same reference numerals. However, in the turbine blade 1002, the shroud 108 further includes a second recessed surface 1004 extending at least radially and circumferentially from the second abutment surface 112 to the inner platform surface 114. The second recessed surface 1004 is radially spaced apart from the outer platform surface 116 and extends at least axially along at least a portion of the second abutment surface 112. In the illustrated embodiment of FIGS. 10A and 10B, the second recessed surface 1004 extends at least axially along the portion of the second abutment surface 112 from the trailing surface 120 towards the leading surface 122, such that the second recessed surface 1004 is at least axially spaced apart from the leading surface 122. The second recessed surface 1004 defines a second recessed region 1006 configured to receive a flow of the cooling fluid from an circumferentially adjacent turbine blade. In some cases, shape and dimensions of the second recessed surface 1004 may be same as the shape and dimensions of the first recessed surface 132 illustrated in FIGS. 3A-3D and 4.

Figure 10C:
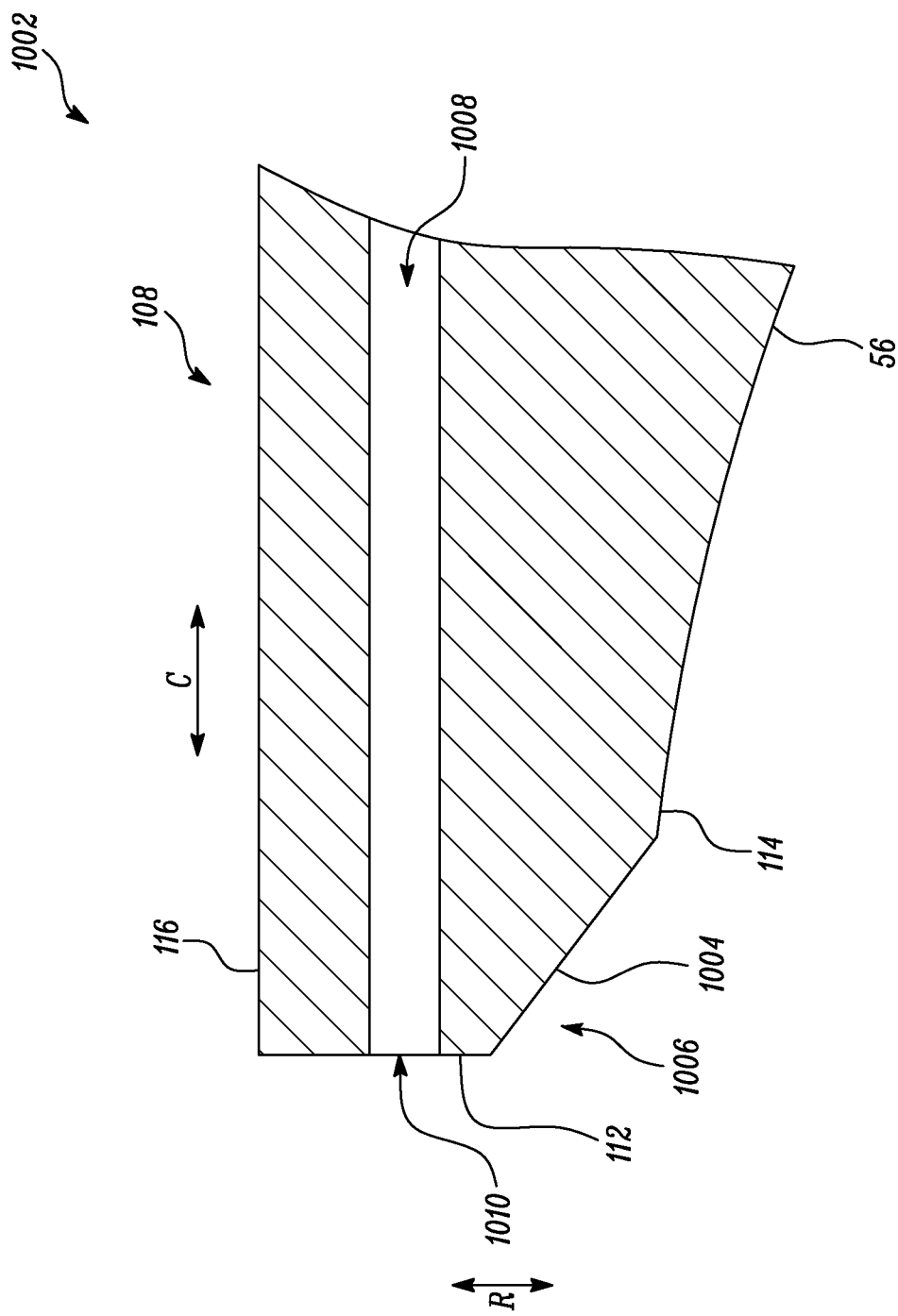
FIG. 10C is a cross-sectional view of a portion of the turbine blade of FIGS. 10A and 10B, according to an embodiment of the present disclosure.

FIG. 10C is a cross-sectional view of a portion of the turbine blade 1002 along the circumferential direction C, according to an embodiment of the present disclosure. With reference to FIGS. 10A-10C, in addition to the at least one first internal cooling passage 134 (shown in FIG. 4 for the turbine blade 102 to which the turbine blade 1002 is substantially similar), the shroud 108 further includes at least one second internal cooling passage 1008 and at least one second passage opening 1010 disposed on the second abutment surface 112. The at least one second internal cooling passage 1008 extends from the at least one second passage opening 1010, such that the at least one second internal cooling passage 1008 is configured to discharge a flow of the cooling fluid through the at least one second passage opening 1010. The cooling fluid flows through the at least one second internal cooling passage 1008 to cool the components of the turbine blade 1002. Further, the second recessed surface 1004 is spaced apart and fluidly separate from the at least one second passage opening 1010. Specifically, the second recessed surface 1004 is at least radially spaced apart from the at least one second passage opening 1010.

Figure 11A:
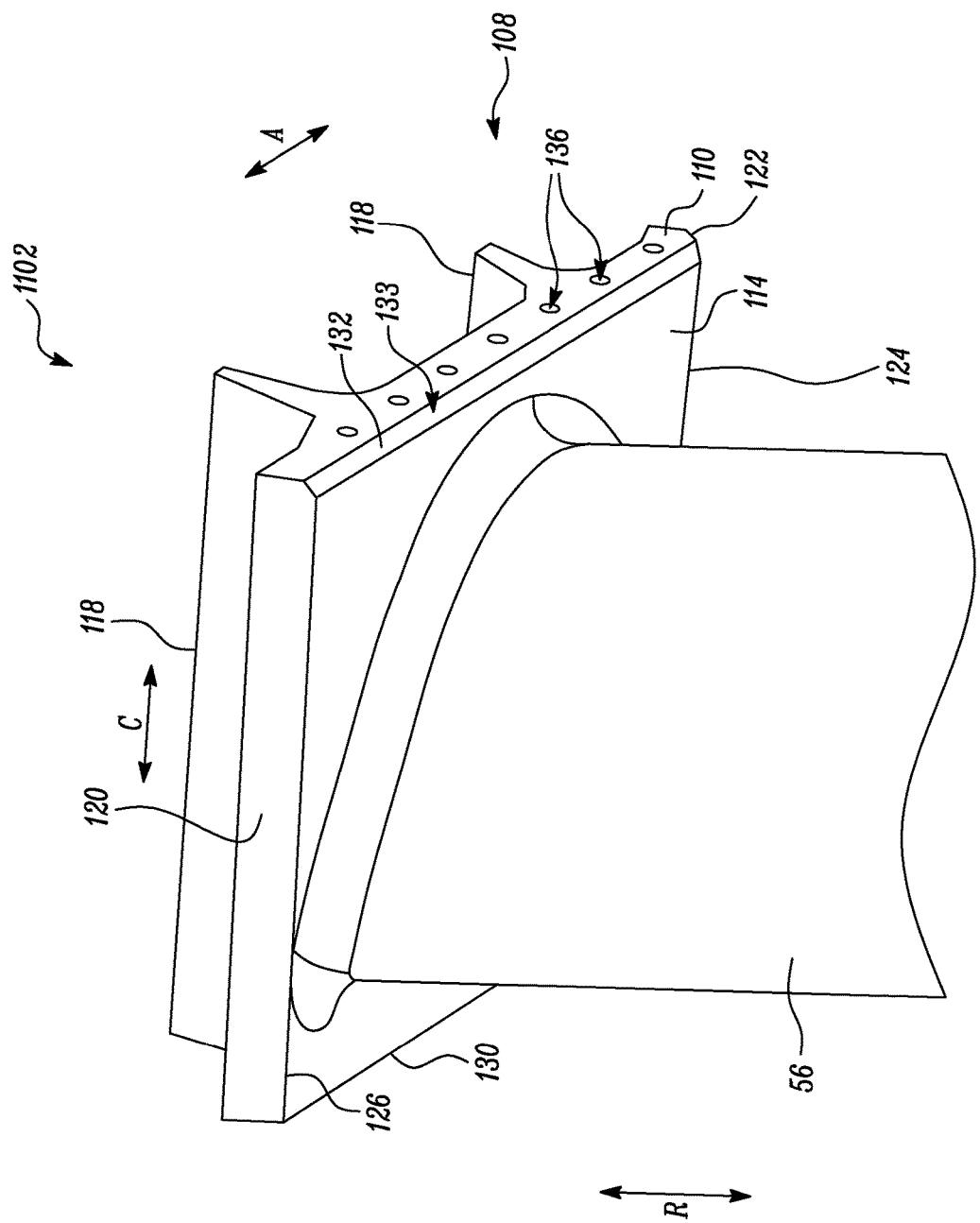
FIG. 11A is a partial perspective view of a turbine blade of the turbine of FIG. 2, according to an embodiment of the present disclosure.

FIG. 11A is a perspective view of a turbine blade 1102 of the turbine 100 (shown in FIG. 2), according to an embodiment of the present disclosure. The turbine blade 1102 is substantially similar to the turbine blade 102 illustrated in FIG. 3A, with common components being referred to by the same reference numerals. However, in the turbine blade 1102, the first recessed surface 132 extends at least axially along the first abutment surface 110 from the trailing surface 120 to the leading surface 122. Further, an axial extent of the first recessed surface 132 may be substantially equal to an axial extent of the first abutment surface 110. The first recessed surface 132 also separates the first abutment surface 110 from the inner platform surface 114. Therefore, in the turbine blade 1102, the first abutment surface 110 and the inner platform surface 114 do not intersect with each other. Further, in the turbine blade 1102, the first recessed surface 132 intersects each of the shroud leading edge 124 and the shroud trailing edge 126.

Figure 11B:
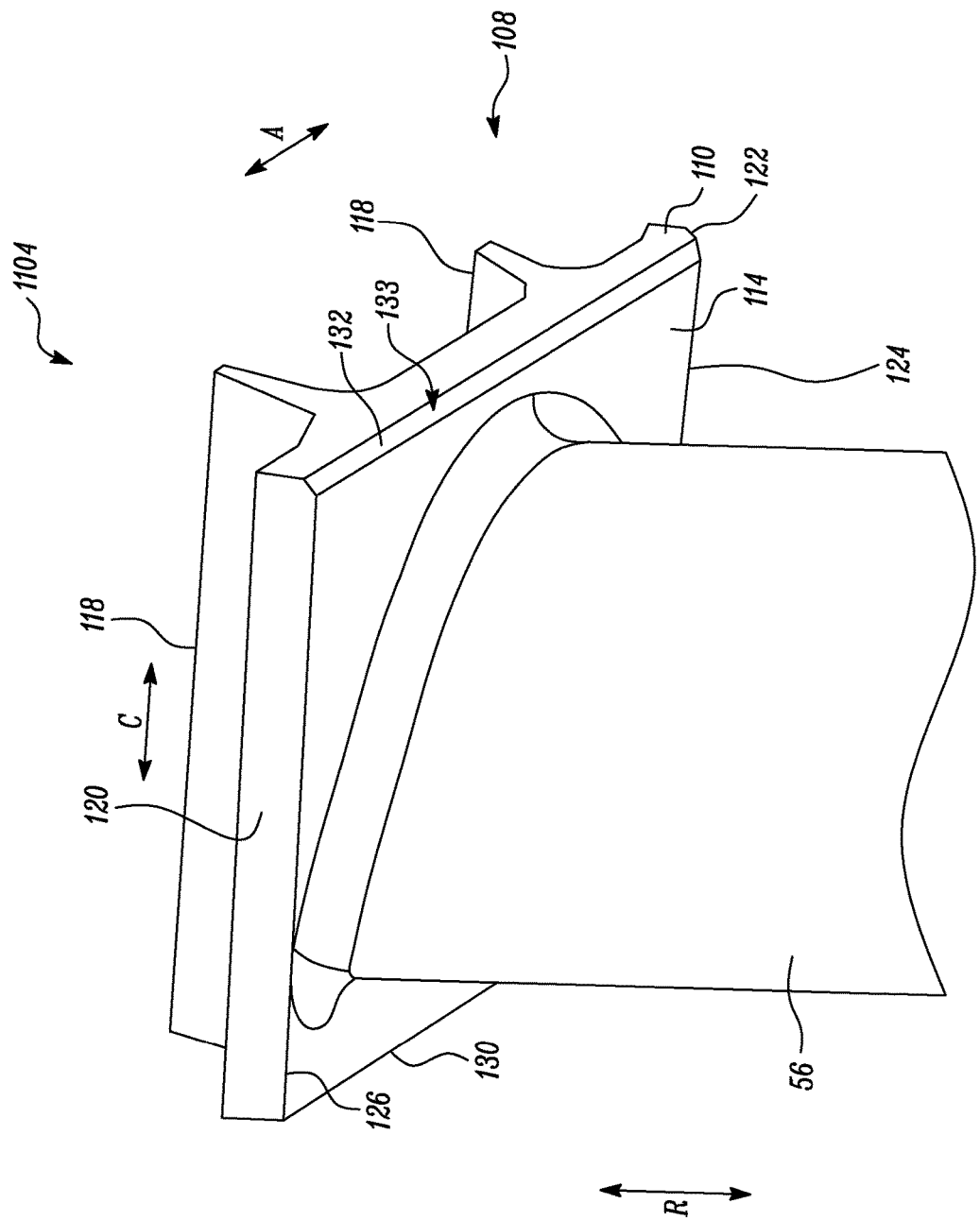
FIG. 11B is a partial perspective view of a turbine blade of the turbine of FIG. 2, according to another embodiment of the present disclosure.

FIG. 11B is a perspective view of a turbine blade 1104 of the turbine 100 (shown in FIG. 2), according to an embodiment of the present disclosure. The turbine blade 1104 is substantially similar to the turbine blade 1102 illustrated in FIG. 11A, with common components being referred to by the same reference numerals. However, in the turbine blade 1104, the shroud 108 does not include any internal cooling passage and corresponding passage opening.

Figure 12:
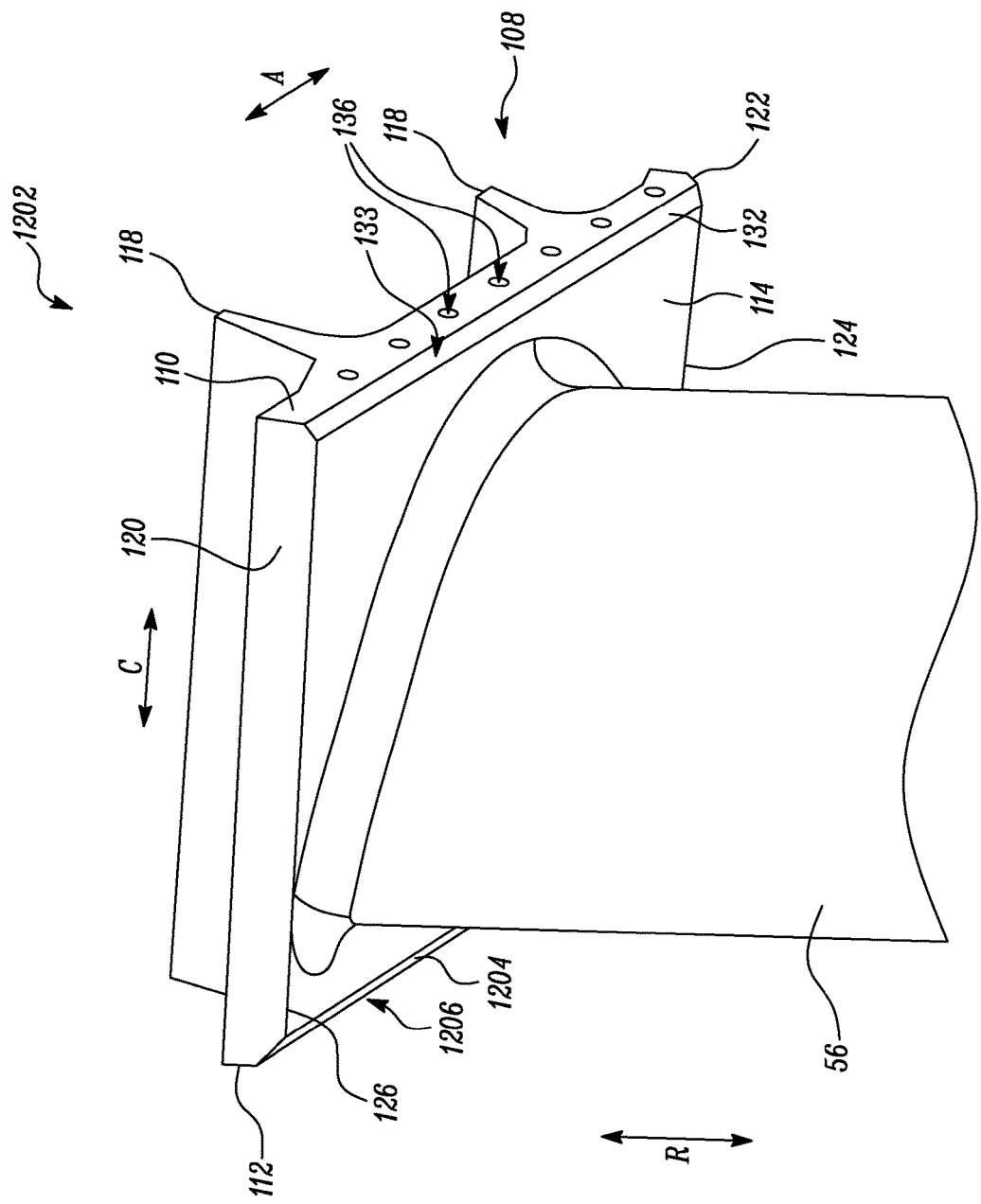
FIG. 12 is a partial perspective view of a turbine blade of the turbine of FIG. 2, according to another embodiment of the present disclosure.

FIG. 12 is a perspective view of a turbine blade 1202 of the turbine 100 (shown in FIG. 2), according to an embodiment of the present disclosure. The turbine blade 1202 is substantially similar to the turbine blade 1102 illustrated in FIG. 11A, with common components being referred to by the same reference numerals. However, in the turbine blade 1202, the shroud 108 further includes a second recessed surface 1204 extending at least radially and circumferentially from the second abutment surface 112 to the inner platform surface 114. The second recessed surface 1204 is radially spaced apart from the outer platform surface 116 and extends at least axially along the second abutment surface 112 from the trailing surface 120 to the leading surface 122. Further, an axial extent of the second recessed surface 1204 may be substantially equal to an axial extent of the second abutment surface 112. The second recessed surface 1204 also separates the second abutment surface 112 from the inner platform surface 114. Therefore, in the turbine blade 1202, the second abutment surface 112 and the inner platform surface 114 do not intersect with each other. Further, in the turbine blade 1202, the second recessed surface 1204 intersects each of the shroud leading edge 124 and the shroud trailing edge 126. Moreover, the second recessed surface 1204 defines a second recessed region 1206 configured to receive a flow of the cooling fluid from an circumferentially adjacent turbine blade.

Figure 13A:
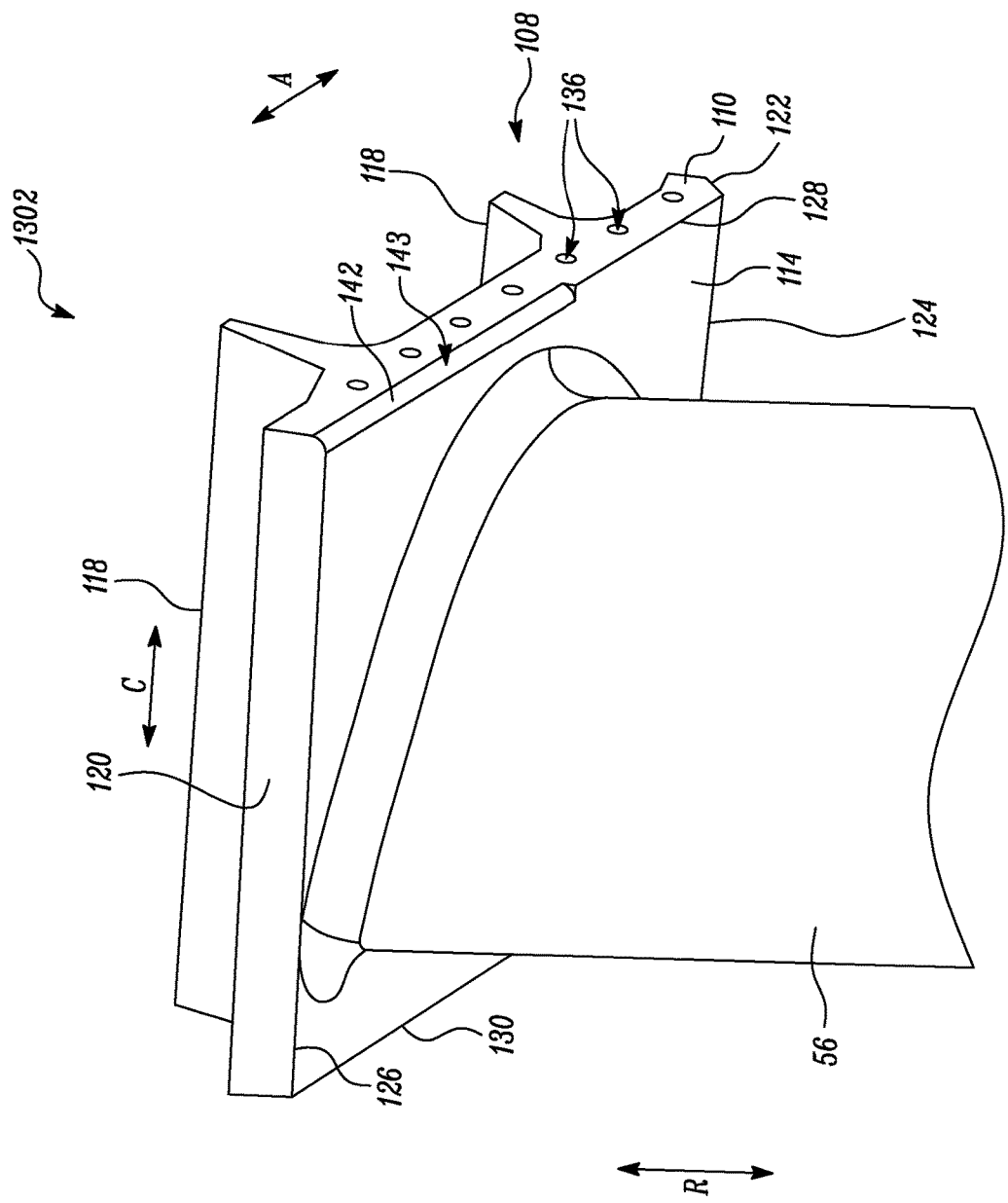
FIG. 13A is a partial perspective view of a turbine blade of the turbine of FIG. 2, according to an embodiment of the present disclosure.

FIG. 13A is a perspective view of a turbine blade 1302 of the turbine 100 (shown in FIG. 2), according to an embodiment of the present disclosure. The turbine blade 1302 is substantially similar to the turbine blade 102 illustrated in FIG. 3A, with common components being referred to by the same reference numerals. However, in the turbine blade 1302, the shroud 108 includes a first recessed surface 142 (instead of the first recessed surface 132 shown in FIG. 3A) extending at least radially and circumferentially from the first abutment surface 110 to the inner platform surface 114. The first recessed surface 142 has a curved shape instead of the substantially planar shape of the first recessed surface 132. The first recessed surface 142 is radially spaced apart from the outer platform surface 116 and extends at least axially along at least a portion of the first abutment surface 110. In the illustrated embodiment of FIG. 13A, the first recessed surface 142 extends at least axially along the portion of the first abutment surface 110 from the trailing surface 120 towards the leading surface 122, such that the first recessed surface 142 is at least axially spaced apart from the leading surface 122. The first recessed surface 142 defines a first recessed region 143. The first recessed surface 142 intersects the first abutment edge 128 and the shroud trailing edge 126.

In the illustrated embodiment of FIG. 13A, the first recessed surface 142 has a convex shape. In other words, in the turbine blade 1302, the first recessed surface 142 is curved outwardly relative to the shroud 108. However, in some other embodiments, the first recessed surface 142 may have a concave shape (not shown), i.e., the first recessed surface 142 may be curved inwardly relative to the shroud 108.

Figure 13B:
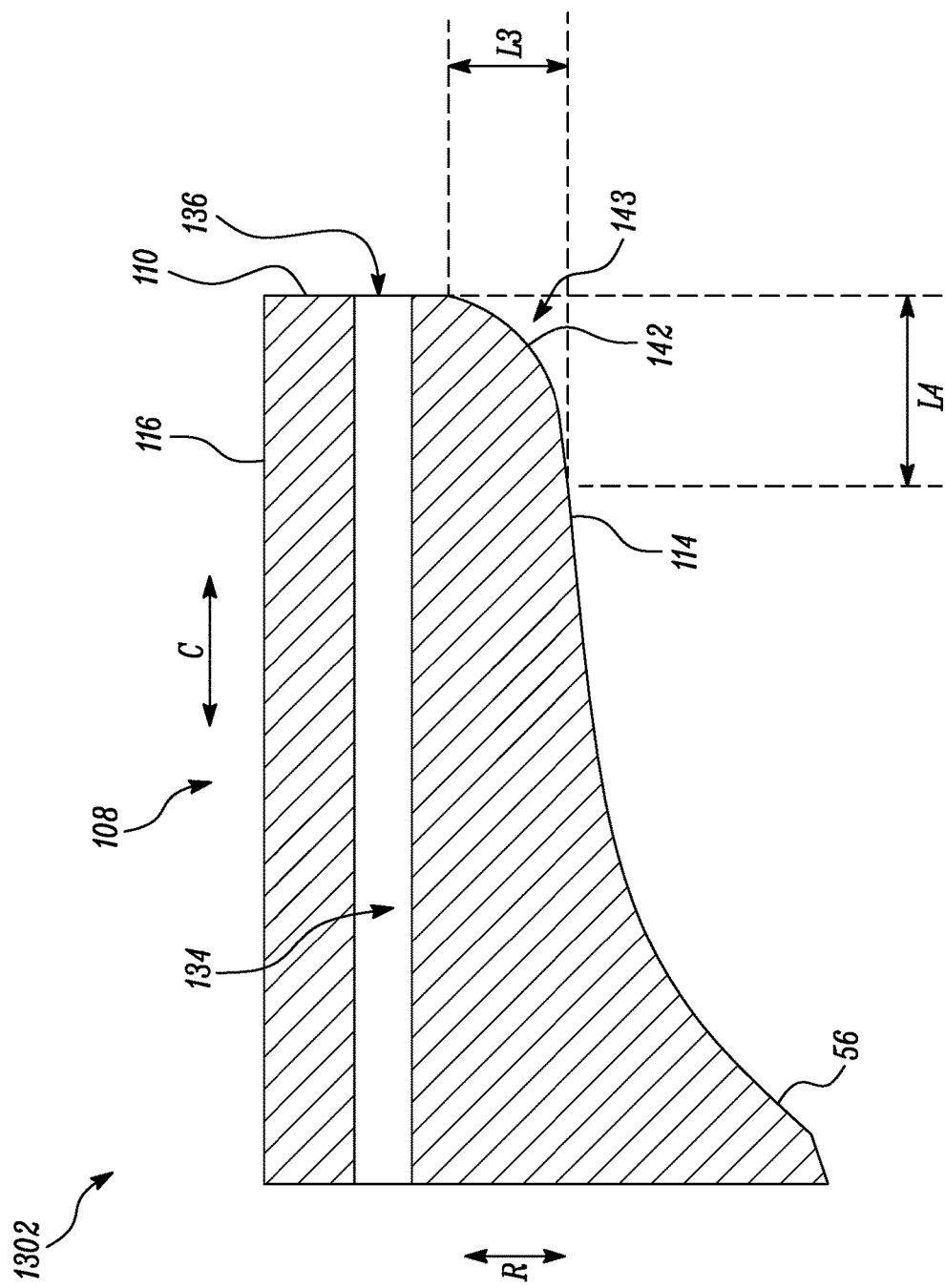
FIG. 13B is a cross-sectional view of a portion of the turbine blade of FIG. 13A, according to an embodiment of the present disclosure.

FIG. 13B is a cross-sectional view of a portion of the turbine blade 1302 (shown in FIG. 13A) along the circumferential direction C, according to an embodiment of the present disclosure.

The first recessed surface 142 has a maximum radial length L3 along the radial direction R and a maximum circumferential length L4 along the circumferential direction C. In some embodiments, a ratio of the maximum radial length L3 of the first recessed surface 142 to the maximum circumferential length L4 of the first recessed surface 142 is from 0.15:1 to 3:1. In some embodiments, the ratio of the maximum radial length L3 to the maximum circumferential length L4 is from 0.7:1 to 1.4:1. In the illustrated embodiment of FIG. 13B, the ratio of the maximum radial length L3 to the maximum circumferential length L4 is from 0.5:1 to 0.8:1.

Figure 13C:
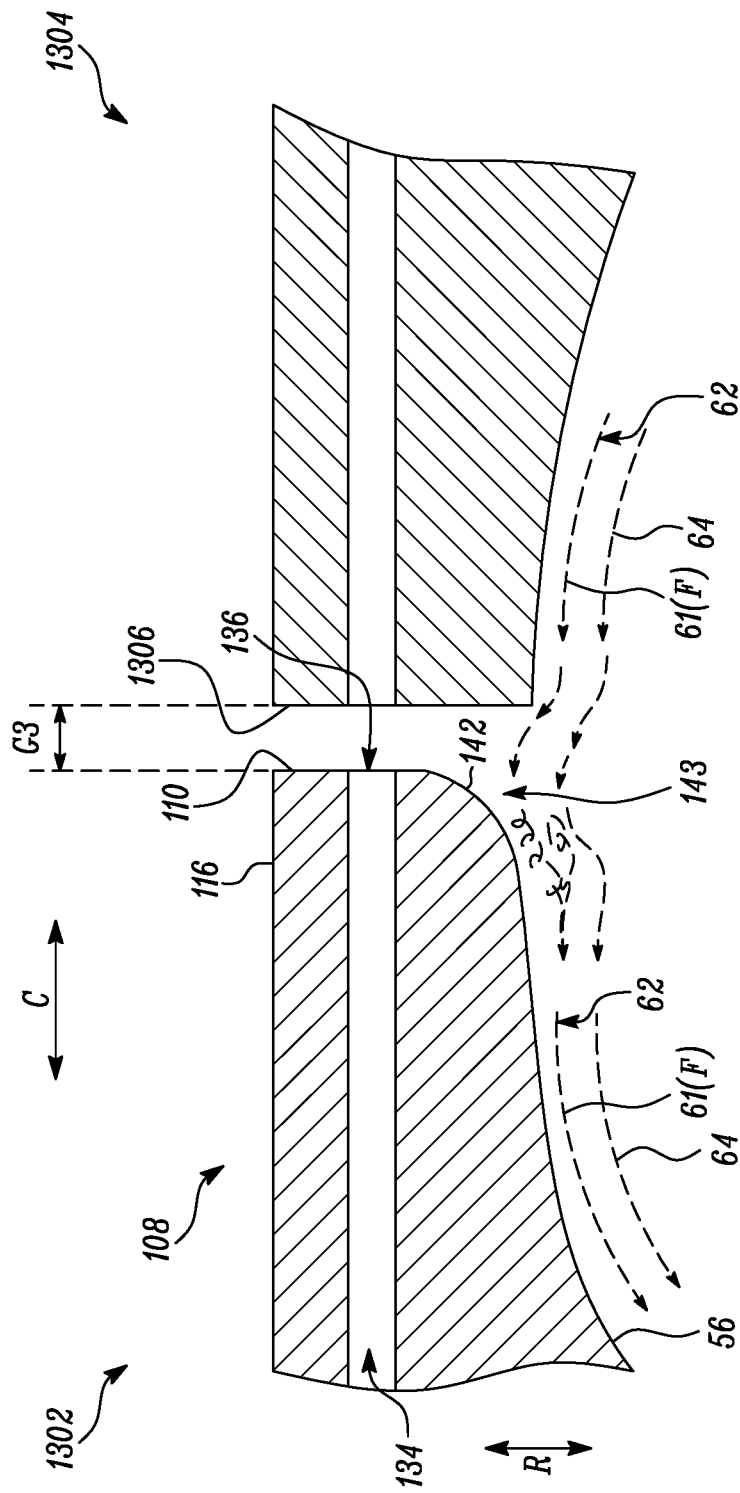
FIG. 13C is a cross-sectional view of the portion of the turbine blade of FIG. 13B and a portion of an circumferentially adjacent turbine blade, according to an embodiment of the present disclosure.

FIG. 13C is a cross-sectional view of the portion (shown in FIG. 13B) of the turbine blade 1302 (shown in FIGS. 13A and 13B) and a portion of an circumferentially adjacent turbine blade 1304, according to an embodiment of the present disclosure. The circumferentially adjacent turbine blade 1304 includes an abutment surface 1306 which faces the first abutment surface 110 when the turbine blade 1302 and the circumferentially adjacent turbine blade 1304 are assembled in the turbine 100 (shown in FIG. 2). In some cases, upon assembling the turbine blade 1302 and the circumferentially adjacent turbine blade 1304 in the turbine 100, a gap G3 is formed between the first abutment surface 110 and the abutment surface 1306. The gap G3 may be formed due to manufacturing tolerances of the turbine blade 1302 and the circumferentially adjacent turbine blade 1304. The first recessed region 143 of the first recessed surface 142 of the turbine blade 1302 is configured to receive a flow of the cooling fluid F (i.e., the flow 61 or the cooling film layer 62) from the circumferentially adjacent turbine blade 1304 and at least partially reduce a leakage of the cooling fluid F through the gap G3. The first recessed surface 142 may also provide a similar functional advantage as the turbine blade 1302 that is provided by the first recessed surface 132 (shown in FIG. 5A) to the turbine blade 102.

Figure 14A:
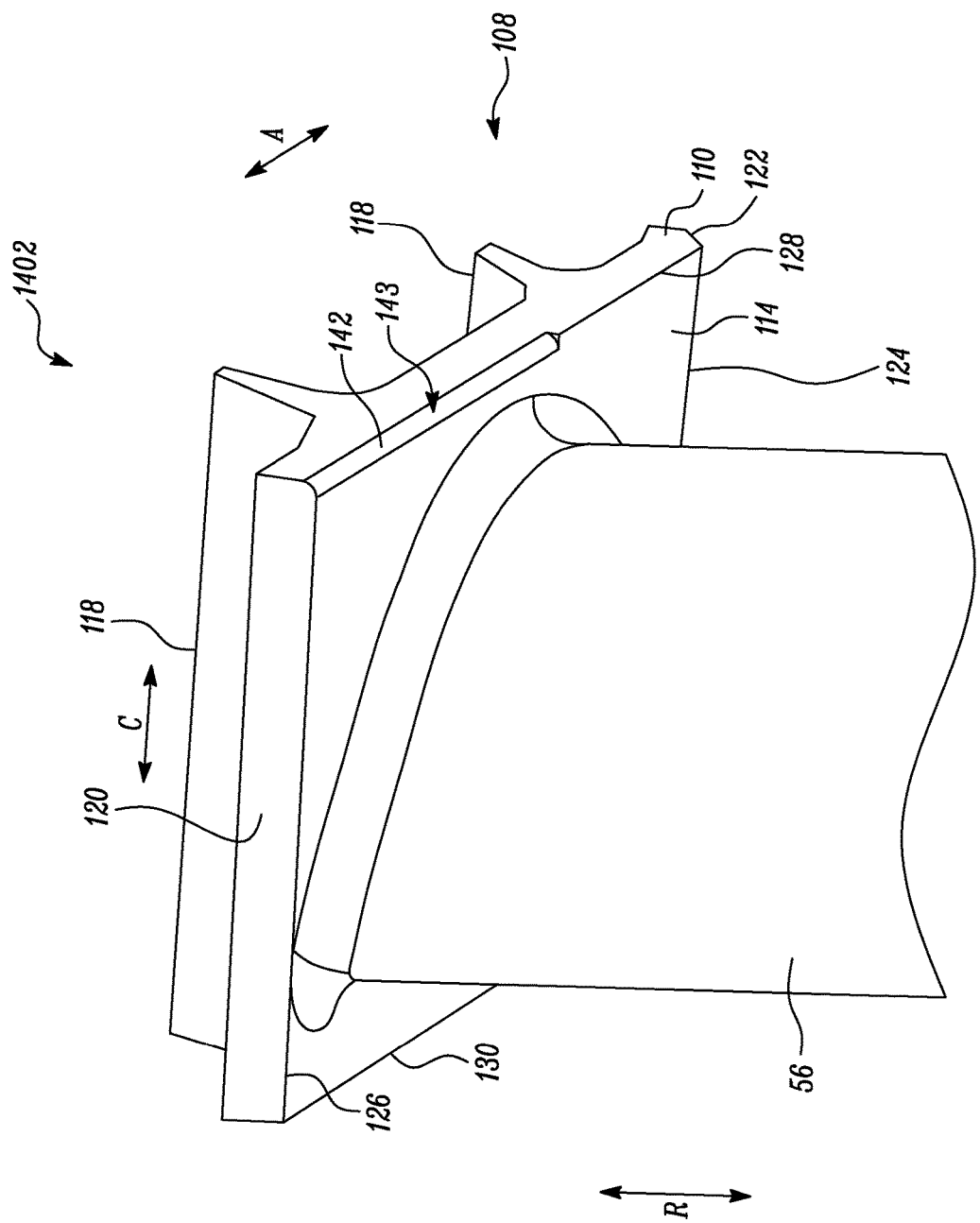
FIG. 14A is a partial perspective view of a turbine blade of the turbine of FIG. 2, according to another embodiment of the present disclosure.

FIG. 14A is a perspective view of a turbine blade 1402 of the turbine 100 (shown in FIG. 2), according to an embodiment of the present disclosure. The turbine blade 1402 is substantially similar to the turbine blade 1302 illustrated in FIG. 13A, with common components being referred to by the same reference numerals. However, in the turbine blade 1402, the shroud 108 does not include any internal cooling passage and corresponding passage opening.

Figure 14B:
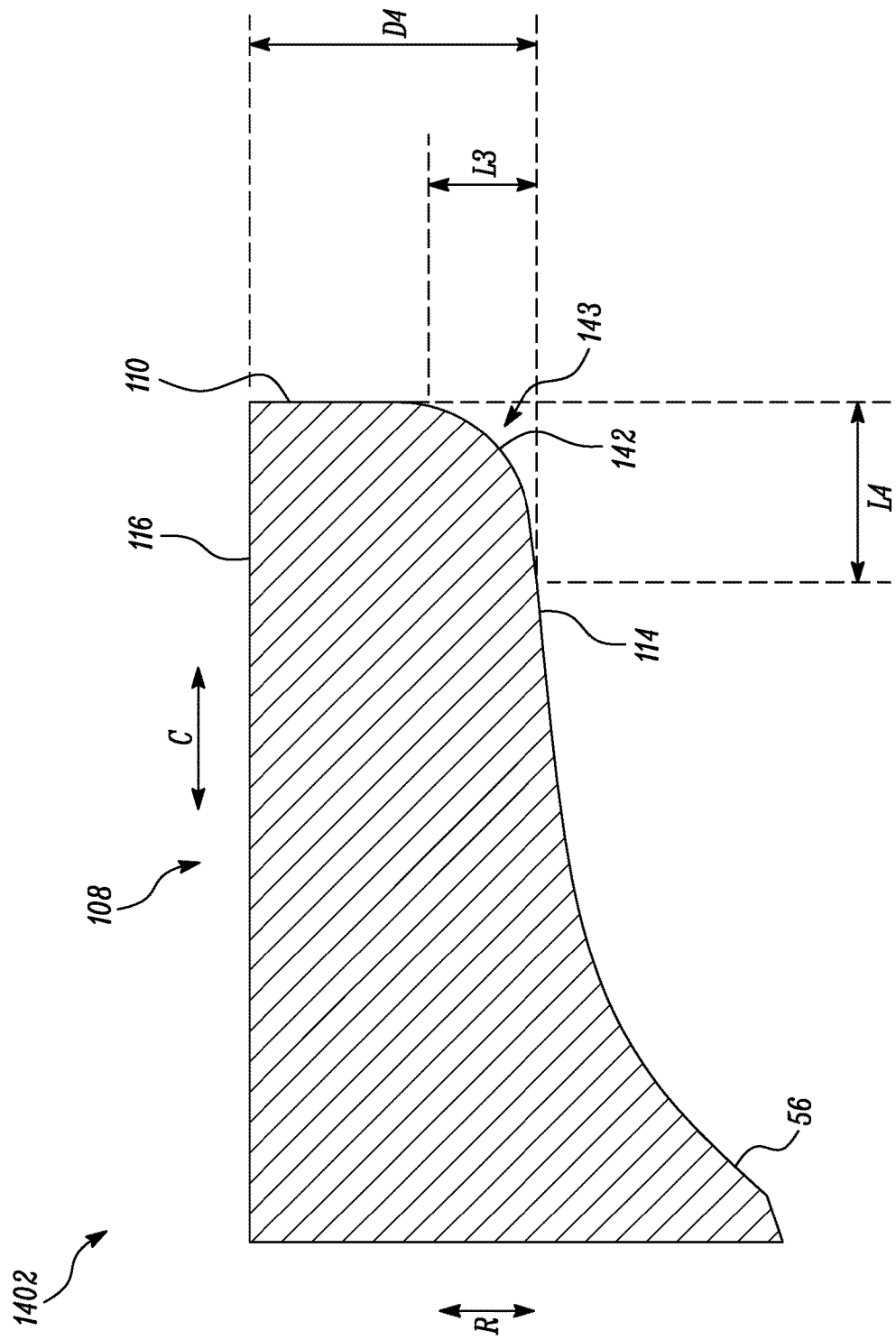
FIG. 14B is a cross-sectional view of a portion of the turbine blade of FIG. 14A, according to an embodiment of the present disclosure.

FIG. 14B is a cross-sectional view of a portion of the turbine blade 1402 along the circumferential direction C, according to an embodiment of the present disclosure. With reference to FIGS. 14A and 14B, the ratio of the maximum radial length L3 of the first recessed surface 142 to the maximum circumferential length L4 of the first recessed surface 142 is from 0.15:1 to 3:1. In the illustrated embodiment of FIG. 14B, the ratio of the maximum radial length L3 to the maximum circumferential length L4 is from 0.7:1 to 1.4:1.

In some embodiments, the maximum radial length L3 of the first recessed surface 142 is from 5% to 50% of a maximum radial distance D4 between the outer platform surface 116 and the first recessed surface 142. The maximum radial distance D4 is measured along the radial direction R. In the illustrated embodiment of FIG. 14B, the maximum radial length L3 of the first recessed surface 142 is from 25% to 40% of the maximum radial distance D4. Further, since the first recessed surface 142 extends to the inner platform surface 114, the maximum radial distance D4 between the outer platform surface 116 and the first recessed surface 142 may correspond to a minimum radial distance between the outer platform surface 116 and the inner platform surface 114.

Figure 15A:
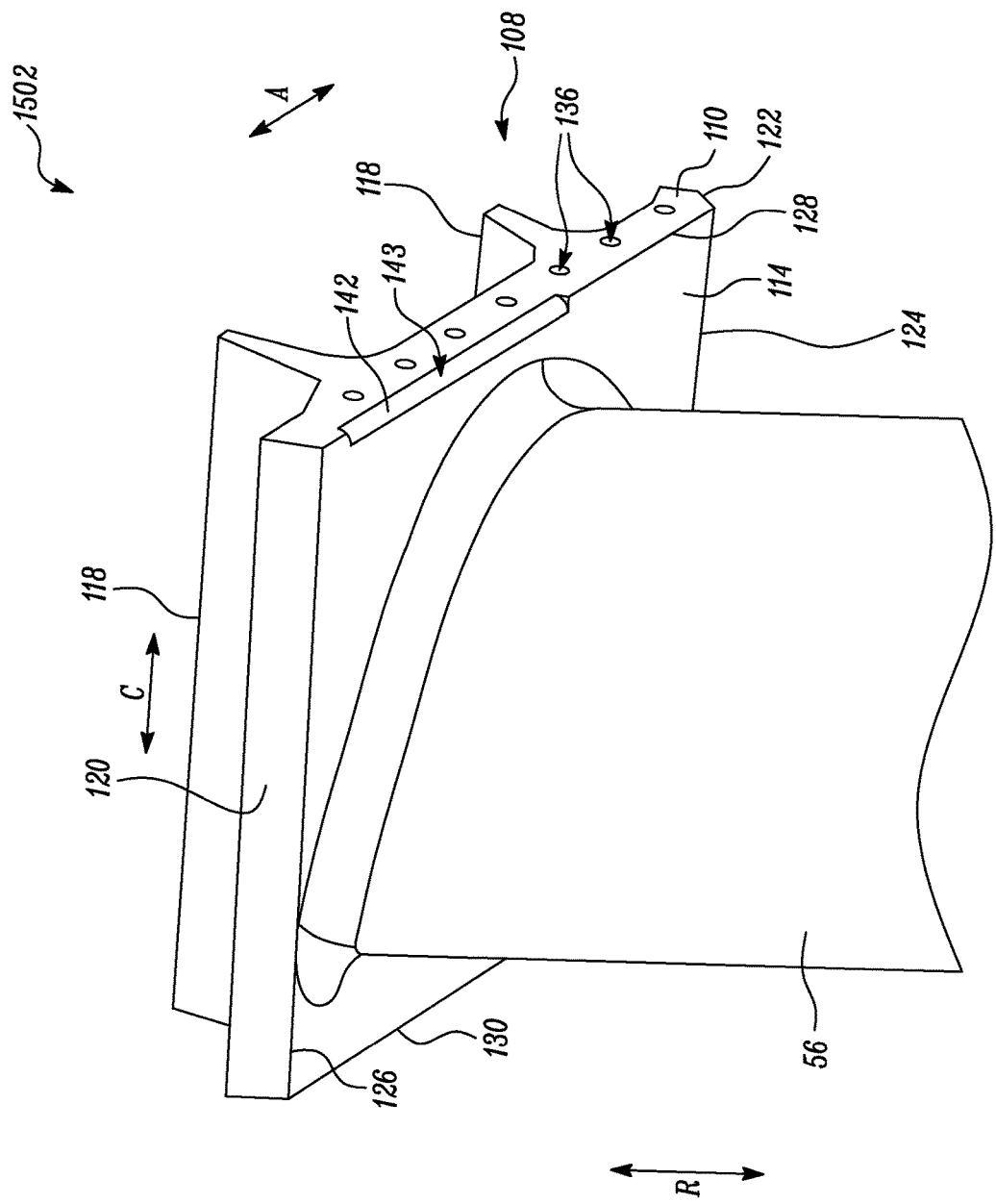
FIG. 15A is a partial perspective view of a turbine blade of the turbine of FIG. 2, according to an embodiment of the present disclosure.

FIG. 15A is a perspective view of a turbine blade 1502 of the turbine 100 (shown in FIG. 2), according to an embodiment of the present disclosure. The turbine blade 1502 is substantially similar to the turbine blade 1302 illustrated in FIG. 13A, with common components being referred to by the same reference numerals. However, in the turbine blade 1502, the first recessed surface 142 is at least axially spaced apart from each of the trailing surface 120 and the leading surface 122. A minimum axial distance between the trailing surface 120 and the first recessed surface 142 is less than a minimum axial distance between the first recessed surface 142 and the leading surface 122. Therefore, the first recessed surface 142 is axially closer to the trailing surface 120 than the leading surface 122.

Figure 15B:
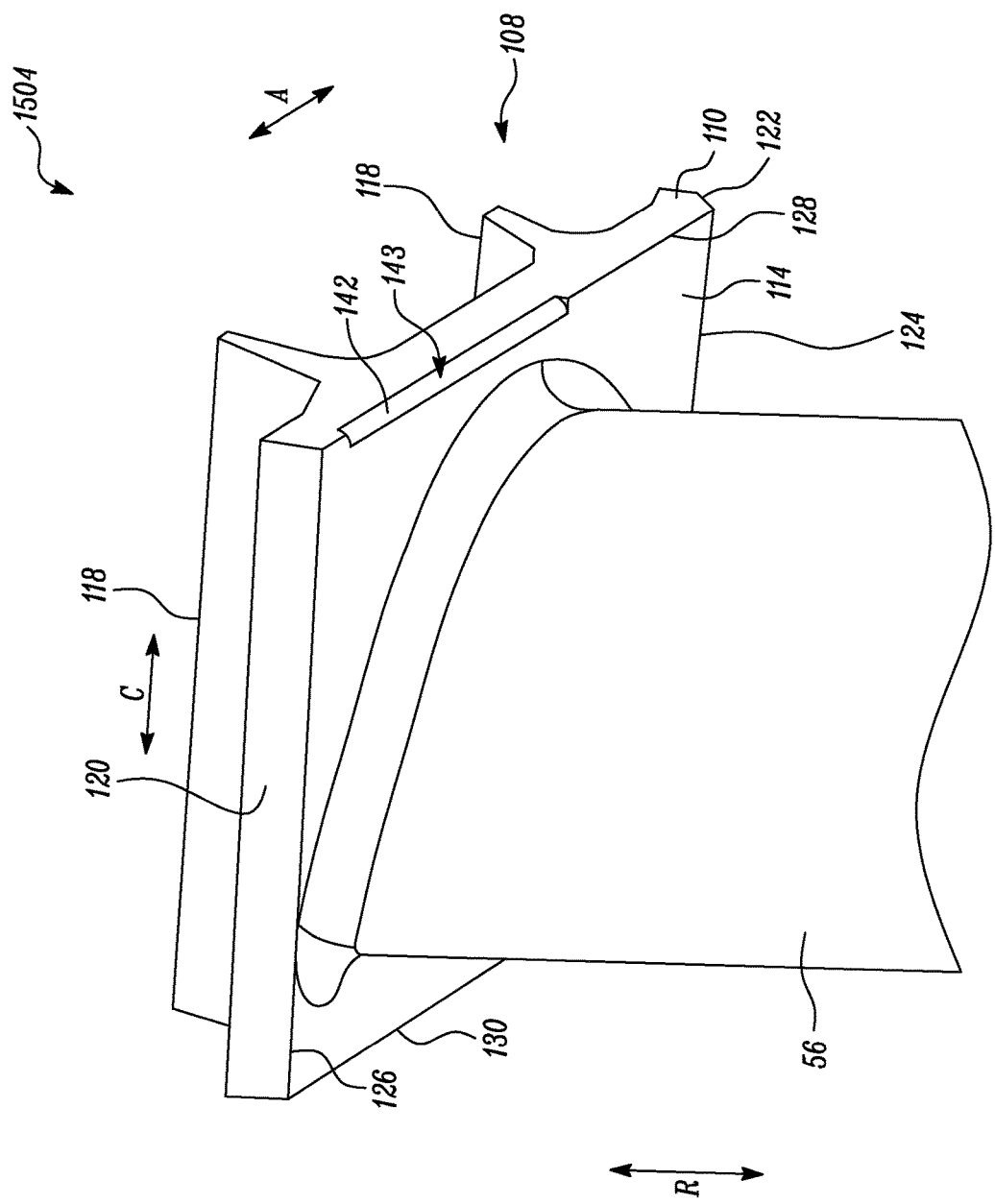
FIG. 15B is a partial perspective view of a turbine blade of the turbine of FIG. 2, according to another embodiment of the present disclosure.

FIG. 15B is a perspective view of a turbine blade 1504 of the turbine 100 (shown in FIG. 2), according to an embodiment of the present disclosure. The turbine blade 1504 is substantially similar to the turbine blade 1502 illustrated in FIG. 15A, with common components being referred to by the same reference numerals. However, in the turbine blade 1504, the shroud 108 does not include any internal cooling passage and corresponding passage opening.

Figure 16A:
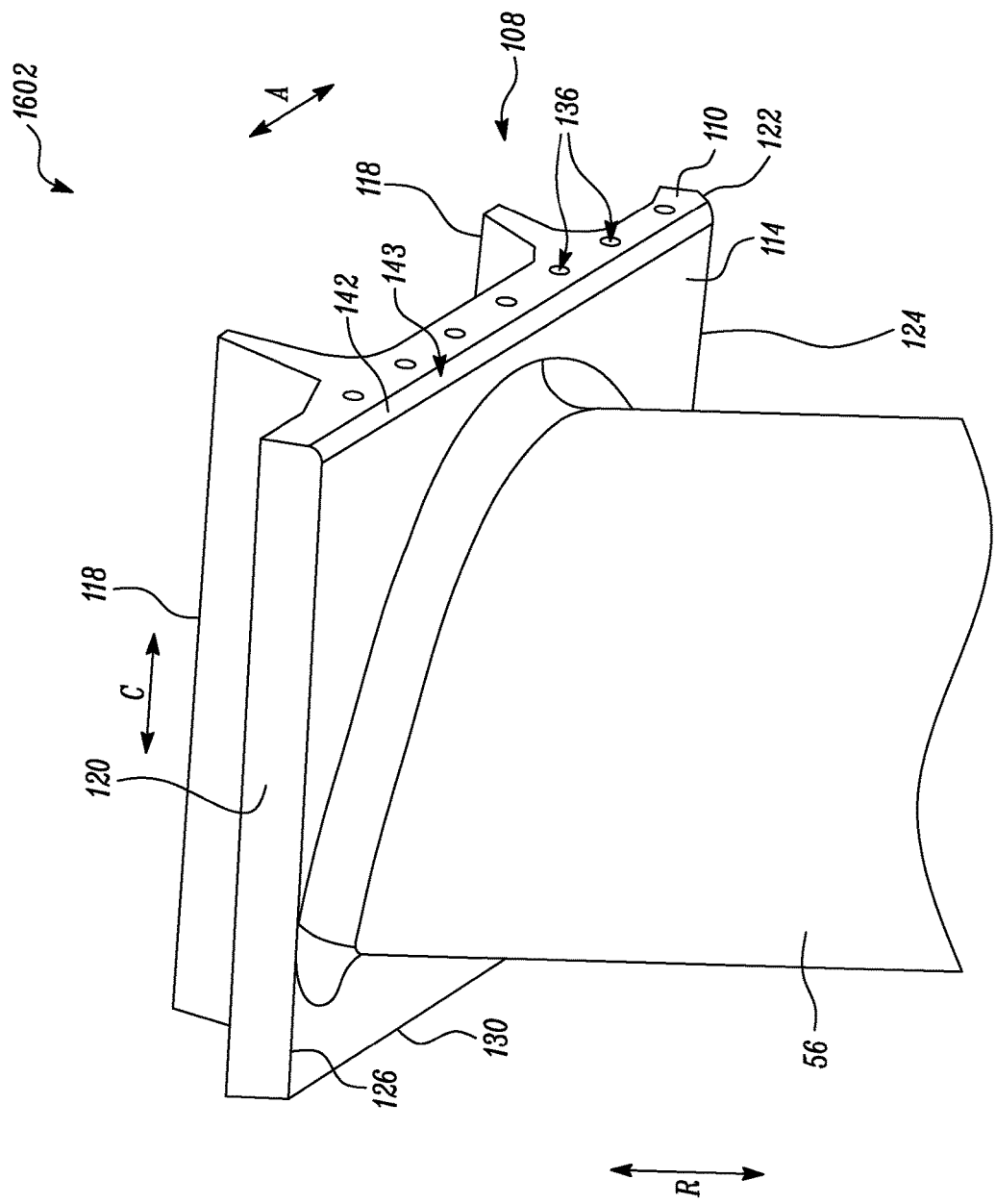
FIG. 16A is a partial perspective view of a turbine blade of the turbine of FIG. 2, according to an embodiment of the present disclosure.

FIG. 16A is a perspective view of a turbine blade 1602 of the turbine 100 (shown in FIG. 2), according to an embodiment of the present disclosure. The turbine blade 1602 is substantially similar to the turbine blade 1302 illustrated in FIG. 13A, with common components being referred to by the same reference numerals. However, in the turbine blade 1602, the first recessed surface 142 extends at least axially along the first abutment surface 110 from the trailing surface 120 to the leading surface 122. Therefore, in the turbine blade 1602, the first abutment surface 110 and the inner platform surface 114 do not intersect with each other. Further, in the turbine blade 1602, the first recessed surface 142 intersects each of the shroud leading edge 124 and the shroud trailing edge 126.

Figure 16B:
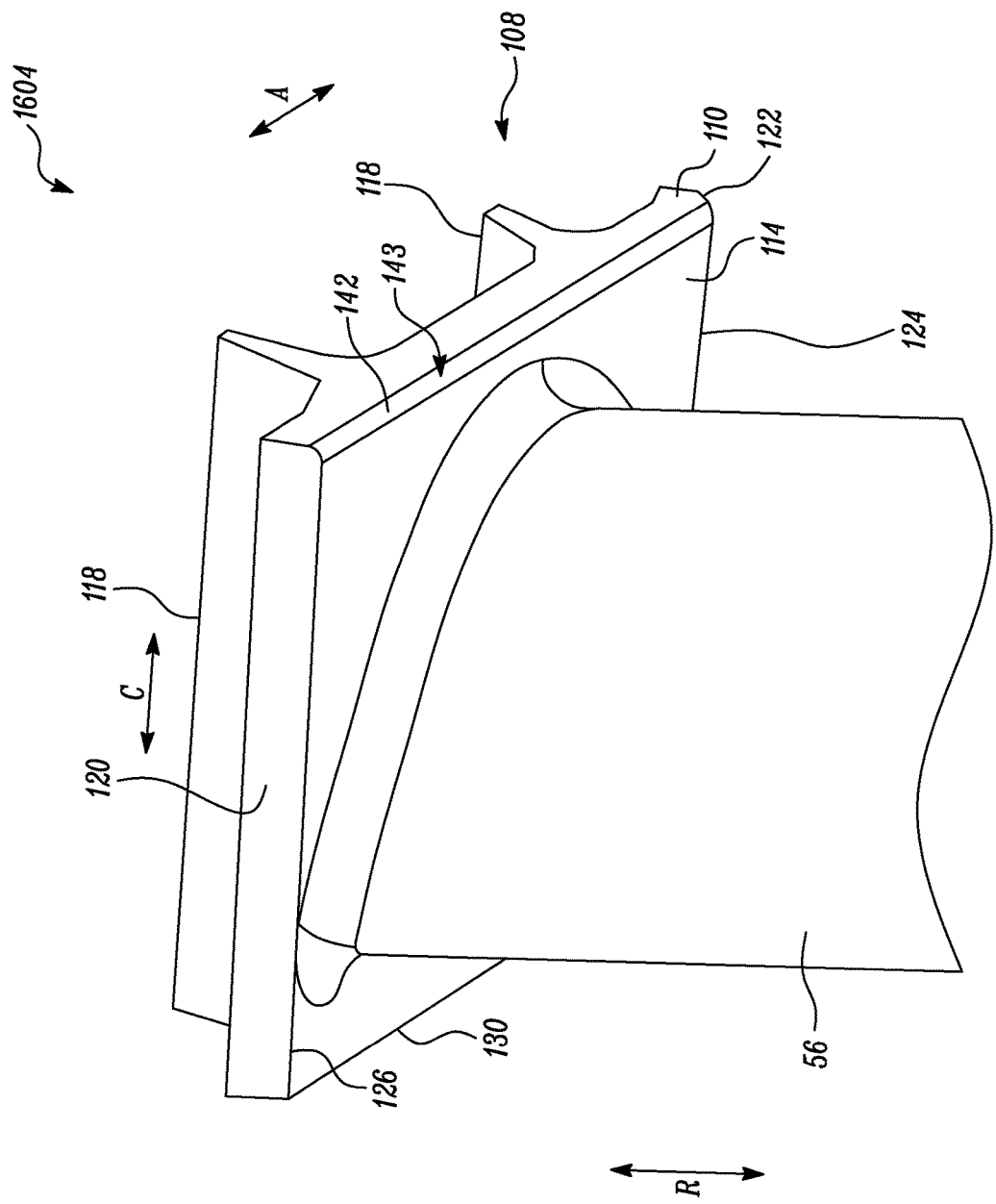
FIG. 16B is a partial perspective view of a turbine blade of the turbine of FIG. 2, according to another embodiment of the present disclosure.

FIG. 16B is a perspective view of a turbine blade 1604 of the turbine 100 (shown in FIG. 2), according to an embodiment of the present disclosure. The turbine blade 1604 is substantially similar to the turbine blade 1602 illustrated in FIG. 16A, with common components being referred to by the same reference numerals. However, in the turbine blade 1604, the shroud 108 does not include any internal cooling passage and corresponding passage opening.

Figure 17A:
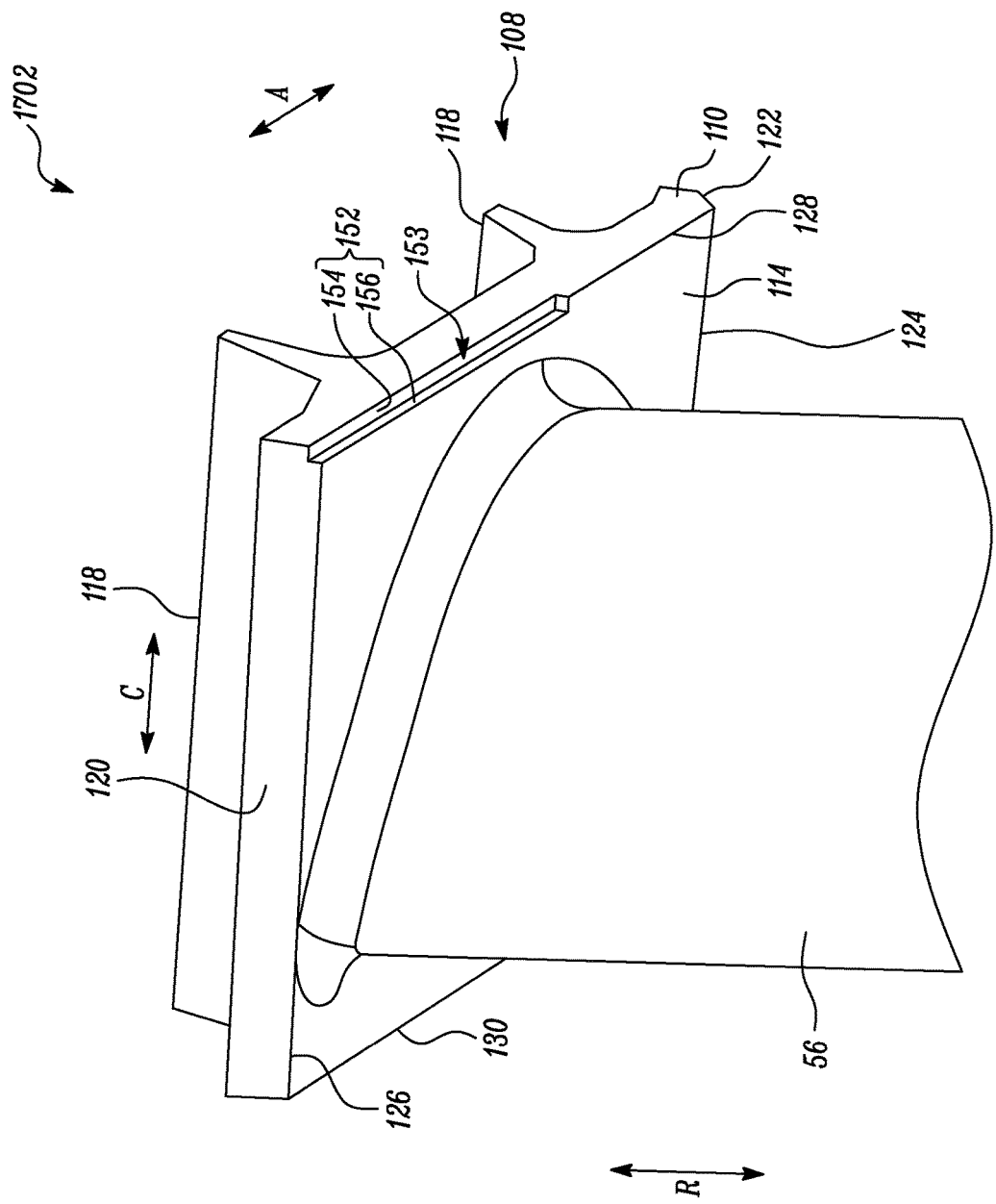
FIG. 17A is a partial perspective view of a turbine blade of the turbine of FIG. 2, according to an embodiment of the present disclosure.

FIG. 17A is a perspective view of a turbine blade 1702 of the turbine 100 (shown in FIG. 2), according to an embodiment of the present disclosure. The turbine blade 1702 is substantially similar to the turbine blade 102 illustrated in FIG. 3A, with common components being referred to by the same reference numerals. However, in the turbine blade 1702, the shroud 108 includes a first recessed surface 152 (instead of the first recessed surface 132 shown in FIG. 3A) extending at least radially and circumferentially from the first abutment surface 110 to the inner platform surface 114. The first recessed surface 152 is radially spaced apart from the outer platform surface 116 and extends at least axially along at least a portion of the first abutment surface 110. In the illustrated embodiment of FIG. 17A, the first recessed surface 152 extends at least axially along the portion of the first abutment surface 110 from the trailing surface 120 towards the leading surface 122, such that the first recessed surface 152 is at least axially spaced apart from the leading surface 122. The first recessed surface 152 defines a first recessed region 153. The first recessed surface 152 intersects the first abutment edge 128 and the shroud trailing edge 126. Further, in the turbine blade 1702, the shroud 108 does not include any internal cooling passage and corresponding passage opening.

Figure 17B:
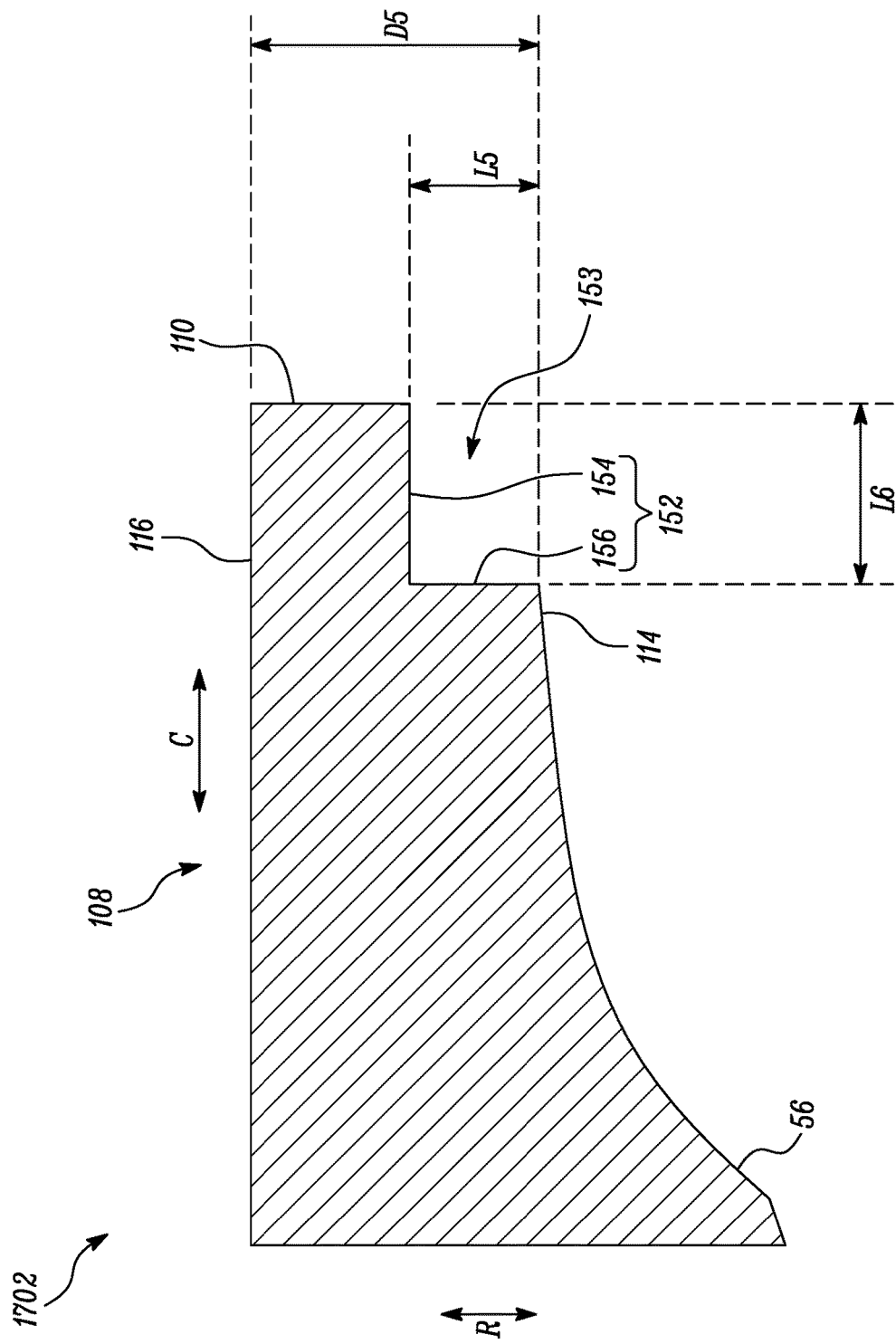
FIG. 17B is a cross-sectional view of a portion of the turbine blade of FIG. 17A, according to an embodiment of the present disclosure.

FIG. 17B is a cross-sectional view of a portion of the turbine blade 1702 (shown in FIG. 17A) along the circumferential direction C, according to an embodiment of the present disclosure. With reference to FIGS. 17A and 17B, the first recessed surface 152 has a first planar portion 154 extending from the first abutment surface 110 and a second planar portion 156 extending from the first planar portion 154 to the inner platform surface 114. The first planar portion 154 is inclined to the second planar portion 156. In the illustrated embodiment of FIGS. 17A and 17B, the first planar portion 154 is perpendicular to the second planar portion 156. However, in some other embodiments, the first planar portion 154 may be obliquely inclined to the second planar portion 156.

The first recessed surface 152 has a maximum radial length L5 along the radial direction R and a maximum circumferential length L6 along the circumferential direction C. The maximum radial length L5 of the first recessed surface 152 is a radial length of the second planar portion 156. The maximum circumferential length L6 of the first recessed surface 152 is a circumferential length of the first planar portion 154. In some embodiments, a ratio of the maximum radial length L5 of the first recessed surface 152 to the maximum circumferential length L6 of the first recessed surface 152 is from 0.15:1 to 3:1. In the illustrated embodiment of FIG. 13B, the ratio of the maximum radial length L5 to the maximum circumferential length L6 is from 0.5:1 to 1:1.

In some embodiments, the maximum radial length L5 of the first recessed surface 152 is from 5% to 50% of a maximum radial distance D5 between the outer platform surface 116 and the first recessed surface 152. The maximum radial distance D5 is measured along the radial direction R. In the illustrated embodiment of FIG. 13B, the maximum radial length L5 of the first recessed surface 152 is from 25% to 40% of the maximum radial distance D5.

Figure 17C:
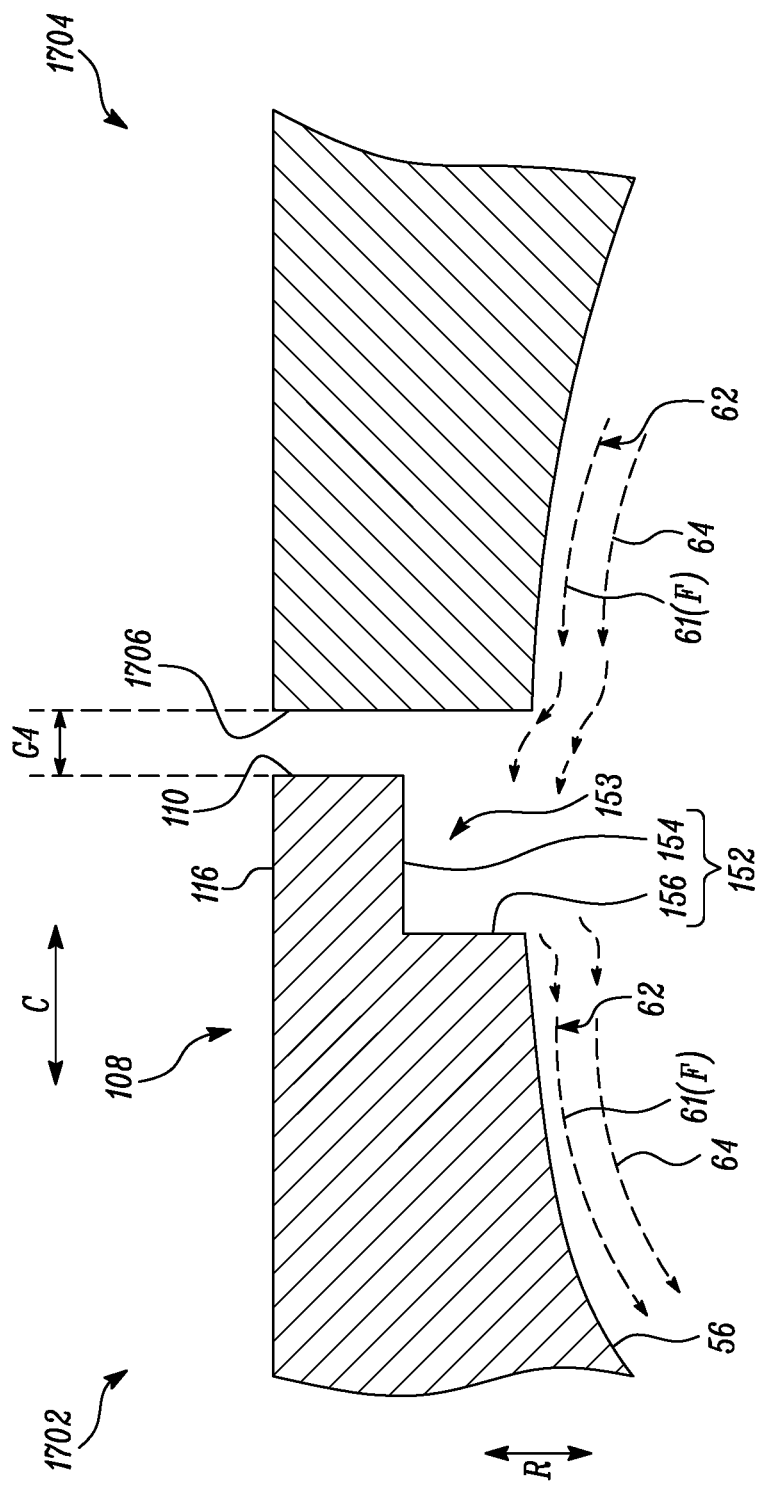
FIG. 17C is a cross-sectional view of the portion of the turbine blade of FIG. 17B and a portion of an circumferentially adjacent turbine blade, according to an embodiment of the present disclosure.

FIG. 17C is a cross-sectional view of the portion (shown in FIG. 17B) of the turbine blade 1702 (shown in FIGS. 17A and 17B) and a portion of an circumferentially adjacent turbine blade 1704, according to an embodiment of the present disclosure. The circumferentially adjacent turbine blade 1704 includes an abutment surface 1706 which faces the first abutment surface 110 when the turbine blade 1702 and the circumferentially adjacent turbine blade 1704 are assembled in the turbine 100 (shown in FIG. 2). In some cases, upon assembling the turbine blade 1702 and the circumferentially adjacent turbine blade 1704 in the turbine 100, a gap G4 is formed between the first abutment surface 110 and the abutment surface 1706. The gap G4 may be formed due to manufacturing tolerances of the turbine blade 1702 and the circumferentially adjacent turbine blade 1704. The first recessed region 153 of the first recessed surface 152 of the turbine blade 1702 is configured to receive a flow of the cooling fluid F (i.e., the flow 61 or the cooling film layer 62) from the circumferentially adjacent turbine blade 1704 and at least partially reduce a leakage of the cooling fluid F through the gap G4. The first recessed surface 152 may also provide a similar functional advantage as the turbine blade 1702 that is provided by the first recessed surface 132 (shown in FIG. 5A) to the turbine blade 102.

It will be understood that the present disclosure is not limited to the embodiments above described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A turbine blade for a turbine of a gas turbine engine, the turbine blade comprising:
    an aerofoil; and
    a shroud attached to the aerofoil, the shroud comprising:
        a first abutment surface configured to face a second abutment surface of a first circumferentially adjacent turbine blade;
        a second abutment surface circumferentially spaced apart from and opposite to the first abutment surface, wherein the second abutment surface is configured to face a first abutment surface of a second circumferentially adjacent turbine blade;
        an inner platform surface extending at least circumferentially between the first abutment surface and the second abutment surface, wherein the inner platform surface is disposed adjacent to the aerofoil;
        an outer platform surface radially spaced apart from the inner platform surface and extending at least circumferentially between the first abutment surface and the second abutment surface;
        at least one first internal cooling passage and at least one first passage opening disposed on the first abutment surface, wherein the at least one first internal cooling passage extends from the at least one first passage opening such that the at least one first internal cooling passage is configured to discharge a flow of a cooling fluid through the at least one first passage opening, and
        a first recessed surface extending at least radially and circumferentially from the first abutment surface to the inner platform surface, wherein the first recessed surface is radially spaced apart from the outer platform surface and extends at least axially along at least a portion of the first abutment surface, and wherein the first recessed surface defines a first recessed region configured to receive a flow of a cooling fluid from the first circumferentially adjacent turbine blade, wherein
        the first recessed surface is at least radially spaced apart from a radially inner-most point of the at least one first passage opening so that a portion of the first abutment surface separates the first recessed surface from the at least one first passage opening, and
        a maximum radial length of the first recessed surface is from 5% to 90% of a minimum radial distance between the at least one first passage opening and the inner platform surface.

2. The turbine blade of claim 1, wherein a minimum radial distance between the first recessed surface and the at least one first passage opening is from 10% to 95% of the minimum radial distance between the at least one first passage opening and the inner platform surface.

3. The turbine blade of claim 1, wherein a ratio of the maximum radial length of the first recessed surface to a maximum circumferential length of the first recessed surface is from 0.15:1 to 3:1.

4. The turbine blade of claim 1, wherein the first recessed surface has a planar shape.

5. The turbine blade of claim 4, wherein the first recessed surface is inclined at an inclination angle with respect to the first abutment surface, and wherein the inclination angle is from 20 degrees to 80 degrees.

6. The turbine blade of claim 1, wherein the first recessed surface has a convex shape.

7. The turbine blade of claim 1, wherein the first recessed surface has a first planar portion extending from the first abutment surface and a second planar portion extending from the first planar portion to the inner platform surface, and wherein the first planar portion is inclined to the second planar portion.

8. The turbine blade of claim 7, wherein the first planar portion is perpendicular to the second planar portion.

9. The turbine blade of claim 1, wherein the shroud further comprises:
    a trailing surface extending at least circumferentially between the first abutment surface and the second abutment surface, the trailing surface further extending at least radially between the inner platform surface and the outer platform surface; and
    a leading surface axially spaced apart from the trailing surface and extending at least circumferentially between the first abutment surface and the second abutment surface, the leading surface further extending at least radially between the inner platform surface and the outer platform surface.

10. The turbine blade of claim 9, wherein the first recessed surface is at least axially spaced apart from each of the trailing surface and the leading surface.

11. The turbine blade of claim 10, wherein the shroud further comprises a first abutment edge formed at an intersection between the first abutment surface and the inner platform surface, and wherein the first recessed surface intersects the first abutment edge.

12. The turbine blade of claim 9, wherein the first recessed surface extends at least axially along the portion of the first abutment surface from the trailing surface towards the leading surface, such that the first recessed surface is at least axially spaced apart from the leading surface.

13. The turbine blade of claim 12, wherein the shroud further comprises a shroud trailing edge formed at an intersection between the trailing surface and the inner platform surface, and wherein the first recessed surface intersects the shroud trailing edge.

14. The turbine blade of claim 9, wherein the first recessed surface extends at least axially along the first abutment surface from the trailing surface to the leading surface.

15. The turbine blade of claim 14, wherein the shroud further comprises a shroud leading edge formed at an intersection between the leading surface and the inner platform surface, and wherein the first recessed surface intersects the shroud leading edge.

16. The turbine blade of claim 1, wherein the first recessed surface comprises a plurality of recessed surface portions axially spaced apart from each other and defining a plurality of corresponding recessed regions, wherein the shroud further comprises a plurality of walls axially spaced apart from each other and extending from the first abutment surface to the inner platform surface, and wherein each recessed surface portion is formed between corresponding adjacent walls from the plurality of walls.

17. The turbine blade of claim 1, wherein the shroud further comprises a second recessed surface extending at least radially and circumferentially from the second abutment surface to the inner platform surface, wherein the second recessed surface is radially spaced apart from the outer platform surface and extends at least axially along at least a portion of the second abutment surface, and wherein the second recessed surface defines a second recessed region configured to receive a flow of a cooling fluid.

18. The turbine blade of claim 17, wherein the shroud further comprises at least one second internal cooling passage and at least one second passage opening disposed on the second abutment surface, wherein the at least one second internal cooling passage extends from the at least one second passage opening such that the at least one second internal cooling passage is configured to discharge a flow of a cooling fluid through the at least one second passage opening, and wherein the second recessed surface is spaced apart and from a point of the at least one second passage opening nearest the second recessed surface so that a portion of the second abutment surface separates the second recessed surface from the at least one second passage opening.

* * * * *